(12) United States Patent
Yoon et al.

(10) Patent No.: US 11,537,900 B2
(45) Date of Patent: Dec. 27, 2022

(54) ANOMALY DETECTION

(71) Applicant: MakinaRocks Co., Ltd., Seoul (KR)

(72) Inventors: Andre S. Yoon, Seoul (KR); Sangwoo Shim, Seoul (KR); Yongsub Lim, Gunpo-si (KR); Ki Hyun Kim, Yongin-si (KR); Byungchan Kim, Seoul (KR)

(73) Assignee: MakinaRocks Co., Ltd., Seoul (KR)

( * ) Notice: Subject to any disclaimer, the term of this patent is extended or adjusted under 35 U.S.C. 154(b) by 355 days.

(21) Appl. No.: 16/725,691

(22) Filed: Dec. 23, 2019

(65) Prior Publication Data

US 2020/0234143 A1 Jul. 23, 2020

Related U.S. Application Data

(60) Provisional application No. 62/795,690, filed on Jan. 23, 2019.

(30) Foreign Application Priority Data

Apr. 30, 2019 (KR) .................. 10-2019-0050477

(51) Int. Cl.
*G06N 3/08* (2006.01)
*G06N 3/04* (2006.01)
*G07C 3/14* (2006.01)

(52) U.S. Cl.
CPC ........... *G06N 3/088* (2013.01); *G06N 3/0454* (2013.01); *G07C 3/146* (2013.01)

(58) Field of Classification Search
CPC ....... G06N 3/088; G06N 3/0454; G07C 3/146
See application file for complete search history.

(56) References Cited

U.S. PATENT DOCUMENTS 6,965,895 B2   11/2005   Smith et al.
8,306,931 B1   11/2012   Bowman et al.
(Continued)

FOREIGN PATENT DOCUMENTS

KR   10-2018-0055708       11/2018
KR   10-2019-0001781 A     1/2019
KR   10-1940029            1/2019

OTHER PUBLICATIONS

Zhao et al., "Learning to Monitor Machine Health with Convolutional Bi-Directional LSTM Networks", Jan. 30, 2017, Sensors 2017, 17, 273, pp. 1-18. (Year: 2017).*

(Continued)

*Primary Examiner* — Ying Yu Chen
(74) *Attorney, Agent, or Firm* — Knobbe, Martens, Olson & Bear, LLP

(57) ABSTRACT

According to an exemplary embodiment of the present disclosure, a computer program stored in a computer readable storage medium is disclosed. The computer program performs operations for processing input data when the computer program is executed by one or more processors of a computer device, the operations including: obtaining input data based on sensor data obtained during manufacturing of an article by using one or more manufacturing recipes in one or more manufacturing equipment; inputting the input data to a neural network model loaded to the computer device; generating an output by processing the input data by using the neural network model; and detecting an anomaly for the input data based on the output of the neural network model.

22 Claims, 20 Drawing Sheets

(56) References Cited

U.S. PATENT DOCUMENTS

| | | | |
|---|---|---|---|
| 10,002,402 B2 | 6/2018 | Liu et al. | |
| 10,489,703 B2 | 11/2019 | Yang et al. | |
| 10,579,932 B1* | 3/2020 | Cantrell | G06F 17/18 |
| 10,803,384 B2 | 10/2020 | Yoon et al. | |
| 2014/0351642 A1 | 11/2014 | Bates et al. | |
| 2018/0159879 A1* | 6/2018 | Mestha | G06N 3/084 |
| 2019/0130659 A1* | 5/2019 | Ide | G07C 5/0808 |
| 2019/0188212 A1* | 6/2019 | Miller | G06N 20/00 |
| 2019/0384274 A1* | 12/2019 | Bharadwaj | B22F 10/20 |
| 2020/0097921 A1* | 3/2020 | Ghosh | G06Q 10/067 |

OTHER PUBLICATIONS

Wang et al., "Deep learning for smart manufacturing: Methods and applications", Journal of Manufacturing Systems 48 (2018) pp. 144-156.

Notice of Allowance dated Mar. 5, 2020 in counterpart Korean Application No. 10-2019-0050477.

Office Action dated Dec. 2, 2019 in counterpart Korean Application No. 10-2019-0050477.

\* cited by examiner

ANOMALY DETECTION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims priority benefit of U.S. Provisional Application No. 62/795,690, filed Jan. 23, 2019 and foreign priority to Korean Patent Application No. 10-2019-0050477, filed Apr. 30, 2019. Each of these applications is hereby expressly incorporated by reference in its entirety.

FIELD

The present disclosure relates to an artificial intelligence technical field, and more particularly to anomaly detection utilizing artificial intelligence technology.

BACKGROUND

With the accumulation of sensor data that may be temporarily used or stored in a database and permanently used, research is being conducted on the automated processing of monitoring data for a lot of industrial equipment. In order to implement a data state determination method, research is being conducted on artificial intelligence technology using an artificial neural network.

A deep learning model utilizing the artificial neural network provides a method for effectively learning complex nonlinear or dynamic patterns, but when a data to be processed is changed, there have been technical tasks for updating the model.

Korean Patent Application Laid-Open No. KR1020180055708 discloses a method of processing an image by utilizing artificial intelligence.

SUMMARY

The present disclosure is conceived in response to the background art, and has been made in an effort to provide a method of processing data by utilizing artificial intelligence.

According to an exemplary embodiment of the present disclosure for implementing the foregoing object, a computer program stored in a computer readable storage medium is disclosed. The computer program performs operations below for processing input data when the computer program is executed by one or more processors of a computer device, the operations including: obtaining input data based on sensor data obtained during manufacturing of an article by using one or more manufacturing recipes in one or more manufacturing equipment; inputting the input data to a neural network model loaded to the computer device; generating an output by processing the input data by using the neural network model; and detecting an anomaly for the input data based on the output of the neural network model.

In an alternative exemplary embodiment, the operations may further include matching a context indicator that associates the input data with at least one of one manufacturing recipe among the one or more manufacturing recipes and one manufacturing equipment among the one or more manufacturing equipment with the input data and additionally inputting the matched context indicator to the neural network model.

In the alternative exemplary embodiment, the neural network model may be configured to differently process respective input data based on each context indicator matched with each input data.

In the alternative exemplary embodiment, the neural network model may differently process the respective input data by specifying one or all of one manufacturing equipment among the one or more manufacturing equipment and one manufacturing recipe among the one or more manufacturing recipes based on the each context indicator matched with the each input data.

In the alternative exemplary embodiment, the context indicator may include a one hot vector including a sparse representation for at least one of one manufacturing recipe among one or more manufacturing recipes and one manufacturing equipment among one or more manufacturing equipment.

In the alternative exemplary embodiment, the matching of the context indicator with the input data and the additionally inputting of the matched context indicator to the neural network model may include inputting the context indicator matched with the input data to an input layer or an intermediate layer of the neural network model.

In the alternative exemplary embodiment, the operations may further include inputting a context indicator to a first preprocessing neural network model; processing the context indicator by using the first preprocessing neural network model; and additionally inputting the preprocessed context indicator that is an output of the first preprocessing neural network model to the neural network model, in which the preprocessed context indicator is dense representation of the context indicator.

In the alternative exemplary embodiment, the additionally inputting of the preprocessed context indicator that is the output of the first preprocessing neural network model to the neural network model may include inputting the preprocessed context indicator to an input layer or an intermediate layer of the neural network model.

In the alternative exemplary embodiment, the operations may further include matching a context characteristic indicator that associates the input data with at least one of a manufacturing characteristic of one manufacturing recipe among the one or more manufacturing recipes and a manufacturing characteristic of one manufacturing equipment among the one or more manufacturing equipment with the input data and additionally inputting the matched context characteristic indicator to the neural network model.

In the alternative exemplary embodiment, the neural network model may be configured to differently process respective input data based on each context characteristic indicator matched with each input data.

In the alternative exemplary embodiment, the neural network model may differently process the respective input data based on material characteristic information of the article obtained based on each context characteristic indicator matched with each input data.

In the alternative exemplary embodiment, the context characteristic indicator may include a vector representation for at least one of a characteristic of one manufacturing recipe among one or more manufacturing recipes and a characteristic of one manufacturing equipment among the one or more manufacturing equipment.

In the alternative exemplary embodiment, the matching of the context characteristic indicator with the input data and additionally inputting the matched context characteristic indicator to the neural network model may include inputting the context characteristic indicator matched with the input data to an input layer or an intermediate layer of the neural network model.

In the alternative exemplary embodiment, the operations may further include: inputting a context characteristic indicator to a second preprocessing neural network model; processing the context characteristic indicator by using the second preprocessing neural network model; and additionally inputting the preprocessed context characteristic indicator that is an output of the second preprocessing neural network model to the neural network model, in which the preprocessed context characteristic indicator may be a dense representation of the context characteristic indicator.

In the alternative exemplary embodiment, the additionally inputting of the preprocessed context characteristic indicator that is the output of the second preprocessing neural network model to the neural network model may include inputting the preprocessed context characteristic indicator to an input layer or an intermediate layer of the neural network model.

In the alternative exemplary embodiment, the neural network model may be a neural network model capable of processing all or one of encoding and decoding of input data.

In the alternative exemplary embodiment, the anomaly may include all or one of article anomaly for the article and manufacturing equipment anomaly for the one or more manufacturing equipment.

In the alternative exemplary embodiment, the anomaly may include manufacturing anomaly detected by sensor data when the article is produced in the one or more manufacturing equipment.

In the alternative exemplary embodiment, the neural network model may include a neural network function selected from the group consisting of an Auto Encoder (AE), a Denoising Auto encoder (DAE), and a Variational Auto Encoder (VAE).

In the alternative exemplary embodiment, the one or more manufacturing recipes may include an operation parameter of the manufacturing equipment for producing the article loaded to the one or more manufacturing equipment.

In the alternative exemplary embodiment, one input data may be formed of sensor data obtained during manufacturing an article by using one manufacturing recipe among the one or more manufacturing recipes in one manufacturing equipment among the one or more manufacturing equipment.

According to another exemplary embodiment of the present disclosure, a method for processing input data is disclosed. The method may include: obtaining input data based on sensor data obtained during manufacturing of an article by using one or more manufacturing recipes in one or more manufacturing equipment; inputting the input data to a neural network model loaded to the computer device; generating an output by processing the input data by using the neural network model; and detecting an anomaly for the input data based on the output of the neural network model.

According to another exemplary embodiment of the present disclosure, a computer device for processing input data is disclosed. The computer device may include: one or more processors; and a memory configured to store a computer program executable in the one or more processors, in which the one or more processors may obtain input data based on sensor data obtained during manufacturing of an article by using one or more manufacturing recipes in one or more manufacturing equipment; input the input data to a neural network model loaded to the computer device; generate an output by processing the input data by using the neural network model; and detect an anomaly for the input data based on the output of the neural network model.

The present disclosure may provide a method of processing data by using artificial intelligence.

DETAILED DESCRIPTION

Figure 1:
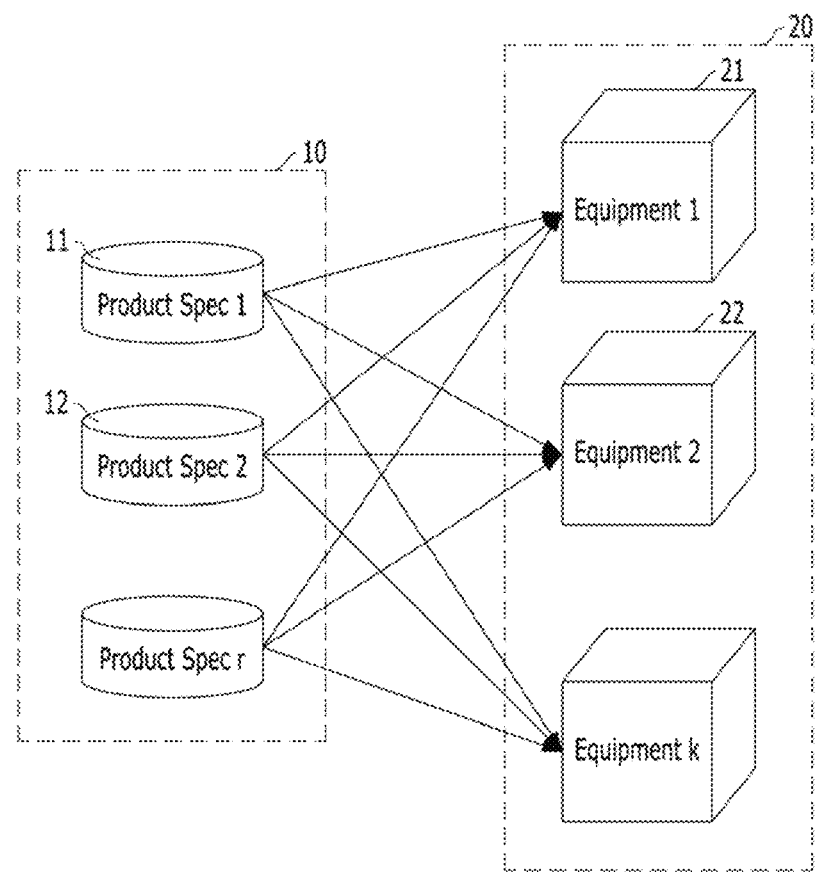
FIG. 1 is a diagram illustrating an example manufacturing environment in which one or more manufacturing equipment produce one or more articles.

Hereinafter, various exemplary embodiments are described with reference to the drawings. In the present specification, various descriptions are presented for understanding the present disclosure. However, it is obvious that the exemplary embodiments may be carried out even without a particular description.

Terms, "component", "module", "system", and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and the computing device may be components. One or more components may reside within a processor and/or an execution thread. One component may be localized within one computer. One component may be distributed between two or more computers. Further, the components may be executed by various computer readable media having various data structures stored therein. For example, components may communicate through local and/or remote processing according to a signal (for example, data transmitted to another system through a network, such as Internet, through data and/or a signal from one component interacting with another component in a local system and a distributed system) having one or more data packets.

A term "or" intends to mean comprehensive "or", not exclusive "or". That is, unless otherwise specified or when it is unclear in context, "X uses A or B" intends to mean one of the natural comprehensive substitutions. That is, when X uses A, X uses B, or X uses both A and B, "X uses A or B" may be applied to any one among the cases. Further, a term "and/or" used in the present specification shall be understood to designate and include all of the possible combinations of one or more items among the listed relevant items.

A term "include" and/or "including" shall be understood as meaning that a corresponding characteristic and/or a constituent element exists. Further, a term "include" and/or "including" means that a corresponding characteristic and/or a constituent element exists, but it shall be understood that the existence or an addition of one or more other characteristics, constituent elements, and/or a group thereof is not excluded. Further, unless otherwise specified or when it is unclear that a single form is indicated in context, the singular shall be construed to generally mean "one or more" in the present specification and the claims.

Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations have been generally described above in the functional aspects thereof. Whether the functionality is implemented as hardware or software depends on a specific application or design restraints given to the general system. Those skilled in the art may implement the functionality described by various methods for each of the specific applications. However, it shall not be construed that the determinations of the implementation deviate from the range of the contents of the present disclosure.

The description about the presented exemplary embodiments is provided so as for those skilled in the art to use or carry out the present invention. Various modifications of the exemplary embodiments will be apparent to those skilled in the art. General principles defined herein may be applied to other exemplary embodiments without departing from the scope of the present disclosure. Accordingly, the present invention is not limited to the exemplary embodiments presented herein. The present invention shall be interpreted within the broadest meaning range consistent to the principles and new characteristics presented herein.

In the present disclosure, a network function, an artificial neural network, and a neural network may be exchangeably used.

The present specification claims priority to U.S. Provisional Patent Application No. 62/795,690 filed in the United States Patent and Trademark Office on Jan. 23, 2019, the content of which is incorporated herein by reference in its entirety.

The content of Korean Patent Application No. 10-2018-0080482, filed on Jul. 11, 2018, is incorporated herein by reference in its entirety.

In the present disclosure, one hot vector has one or more dimensions, and may mean a vector having a coordinate value of 1 for one dimension and having a coordinate value of 0 for the remaining coordinates. That is, the one hot vector may be a vector in which only one component of the vector is 1 and the remaining components are 0.

In the present disclosure, a binary vector may be a vector in which all of the components of the vector have a value of 0 or 1.

In the present disclosure, a neural network model may include one network function or an ensemble of one or more network functions.

FIG. 1 is a diagram illustrating an existing manufacturing environment in which one or more manufacturing equipment produce one or more articles.

In a general manufacturing environment, one or more manufacturing equipment 20 may produce one or more kinds of article. Each of the manufacturing equipment may produce one or more kinds of article. For example, each of the manufacturing equipment 21 and 22 is operated based on manufacturing recipes 11 and 12 related to an operation parameter of the manufacturing equipment for producing the article to produce an article, and the operation parameter of the manufacturing equipment may be changed based on the kind of article to be produced through the manufacturing equipment. A main agent producing an article may produce various kinds of article in accordance with various needs of customers, and when dedicated manufacturing equipment or a dedicated process is provided for each kind of the article, cost consumed for a manufacturing process is increased, so that various articles may be produced with one equipment.

Figure 2A:
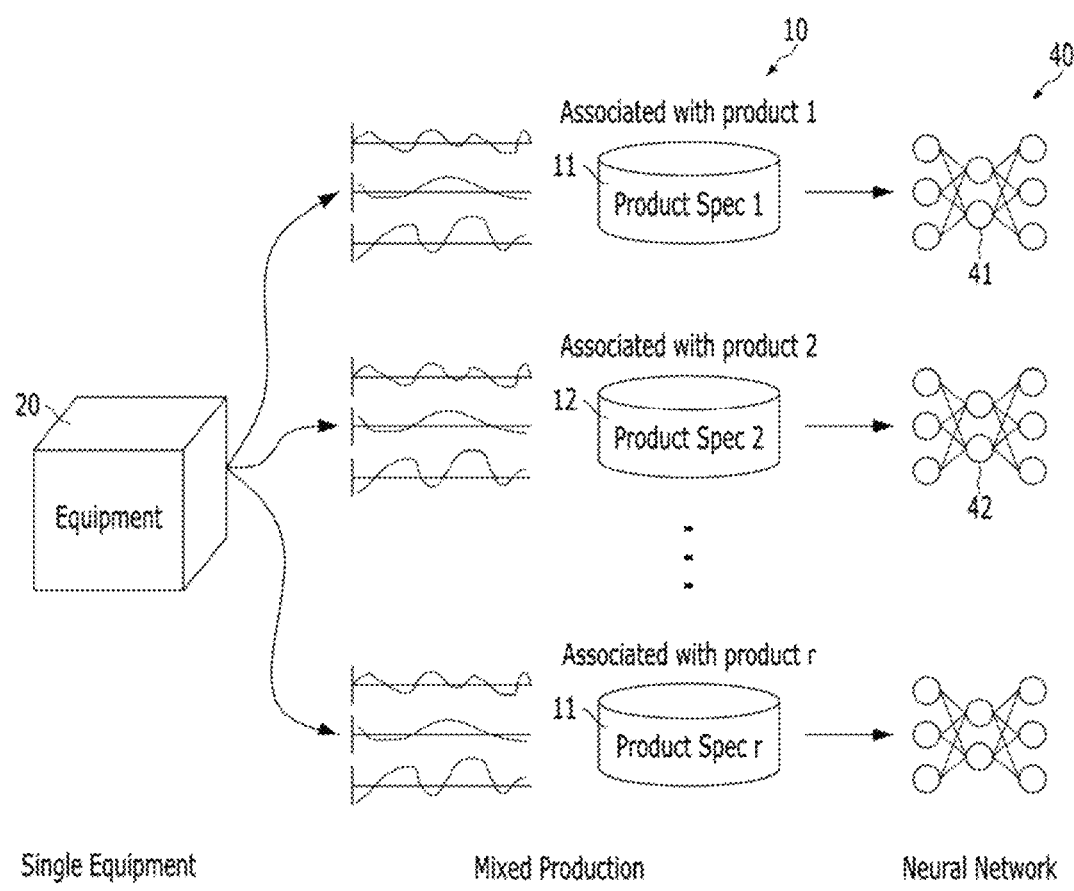
FIGS. 2A and 2B are diagrams illustrating an example modeling approach for anomaly detection in a manufacturing environment in which one or more manufacturing equipment produce one or more articles.
Figure 2B:
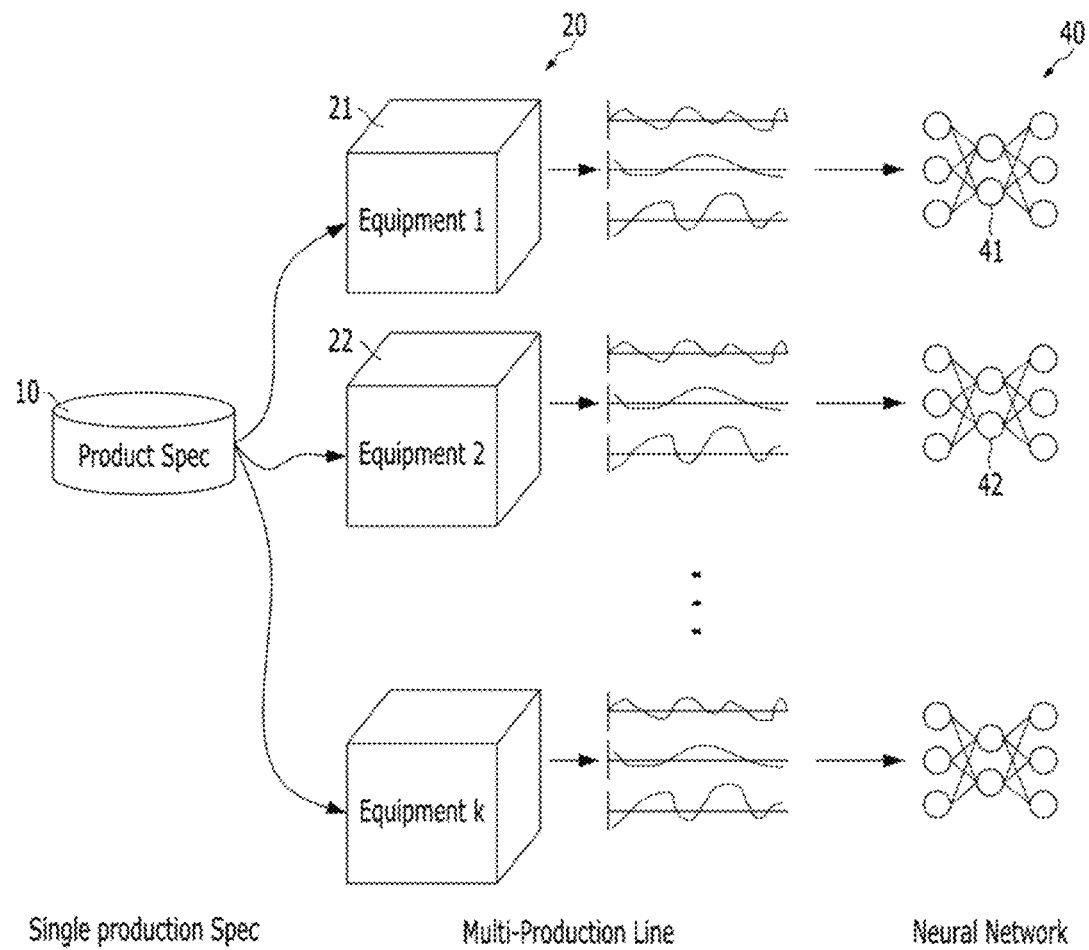

FIGS. 2A and 2B are diagrams illustrating an existing modeling approach for anomaly detection in the existing manufacturing environment in which one or more manufacturing equipment produce one or more articles.

In a manufacturing environment in which an article is produced, anomaly detection may be performed on manufacturing equipment or an article. The anomaly detection for the manufacturing equipment may be the detection for anomaly (for example, failure of equipment) incurable for the manufacturing equipment. The anomaly detection for the article may be the detection for anomaly (for example, fault) incurable for the article.

FIG. 2A is a diagram illustrating an existing modeling approach for anomaly detection in a manufacturing environment in which one equipment produces various articles by various recipes. In FIG. 2A, one manufacturing equipment 20 may produce one or more kinds of article based on the manufacturing recipes 11 and 12 as described above. In this case, sensor data obtainable in the manufacturing equipment 20 may have a plurality of normal states. That is, an operation parameter and sensor data of the manufacturing equipment 20 by a first recipe may be different from an operation parameter and sensor data of the manufacturing equipment by a second recipe, and all of the different operation parameters and sensor data may be in the normal state.

FIG. 2B is a diagram illustrating an existing modeling approach for anomaly detection in a manufacturing environment in which the plurality of manufacturing equipment 20 produces articles by one recipe. In the example of FIG. 2B, the plurality of manufacturing equipment 20 may produce articles by one recipe 10. In this case, the plurality of manufacturing equipment 20 may have different capabilities, so that the operation parameters and the sensor data determined by the same recipe 10 may be different from each other. For example, the operation parameters of the first manufacturing equipment 21 and the second manufacturing equipment 22 for implementing a surface temperature of the same article may be different from each other. In this case, the sensor data obtainable in the manufacturing equipment 21 and 22 may have a plurality of normal states. That is, the operation parameter and the sensor data of the first manufacturing equipment 21 for the manufacturing recipe 10 may be different from the operation parameter and the sensor data of the second manufacturing equipment 22, and all of the different operation parameters and sensor data may be in the normal state.

When it desires to perform anomaly detection on the plurality of normal states by using a neural network model 40, in the existing approach, one neural network model (in this case, one or more network functions within the neural network model may be ensembled) performs anomaly detection on one normal state. That is, for the anomaly detection, the plurality of neural network models 41 and 42 is required for the plurality of normal states, respectively. That is, the normal state may be determined as an anomaly state based on that one normal state is different from another normal state despite the normal state, so that each neural network model may be configured so as to process only one normal state. One neural network model is trained for one normal state, and the plurality of normal states exists in the manufacturing environment, so that the anomaly detection is performed on each of the normal states through the neural network models 41 and 42.

In this case, sensor data obtainable in the manufacturing equipment 20 may have a plurality of normal states. That is, an operation parameter and sensor data of the manufacturing equipment 20 by a first recipe may be different from an operation parameter and sensor data of the manufacturing equipment by a second recipe, and all of the different operation parameters and sensor data may be in the normal state. When it desires to perform anomaly detection on the plurality of normal states by using a neural network model 40, in the existing approach, one neural network model (in this case, one or more network functions within the neural network model may be ensembled) performs anomaly detection on one normal state. That is, for the anomaly detection, the plurality of neural network models 41 and 42 is required for the plurality of normal states, respectively. One neural network model is trained for one normal state, and the plurality of normal states exists in the manufacturing environment, so that the anomaly detection is performed on each of the normal states through the neural network models 41 and 42.

Figure 3:
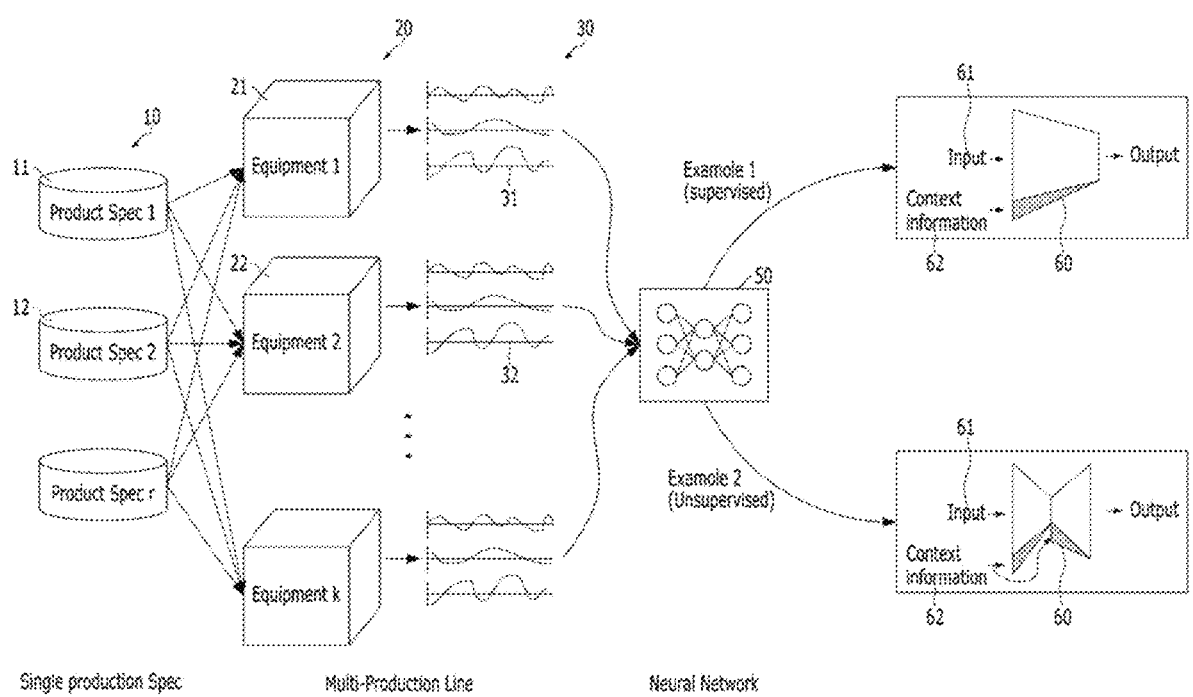
FIG. 3 is a diagram illustrating a single neural network modeling approach for anomaly detection in a manufacturing environment in which one or more equipment produce one or more articles according to an exemplary embodiment of the present disclosure.

FIG. 3 is a diagram illustrating a single neural network modeling approach for anomaly detection in a manufacturing environment in which one or more equipment produce one or more articles according to an exemplary embodiment of the present disclosure.

In the case of the existing approach, for anomaly detection for each manufacturing recipe and each manufacturing equipment, the neural network models need to be provided as many as the number of the combinations of the manufacturing recipes and the manufacturing equipment, so that when the manufacturing equipment and the manufacturing recipe are increased, it is difficult to sufficiently obtain training data for training the neural network model, and the plurality of neural network models is provided, so that lots of training cost of the neural network models may be required. Further, the neural network models are independently trained, so that knowledge of common characteristics for the respective manufacturing recipes and common characteristics for the respective manufacturing equipment are not shared between the neural network models, so that learning efficiency may be low.

FIG. 3 illustrates an approach using one neural network model for anomaly detection in a manufacturing environment in which one or more manufacturing equipment produce one or more articles according to an exemplary embodiment of the present disclosure. As described above, sensor data 30 obtained in a manufacturing environment in which one or more manufacturing equipment produce one or more articles may have a plurality of normal states.

That is, the sensor data obtained in the case where the first manufacturing equipment 21 produces an article based on the first recipe 11 may be different from the sensor data obtained in the case where the second manufacturing equipment 22 produces an article based on the second recipe 12, but both the sensor data may be the normal data. In the exemplary embodiment of the present disclosure, the different kinds of normal state may be determined in the sensor data obtained in the plurality of manufacturing equipment 21 and 22 by using one neural network model. In the exemplary embodiment of the present disclosure, one neural network model 50 may determine a normal state for each of the input data including the plurality of normal states. The neural network model 50 of the present disclosure may perform the anomaly detection independently from a normal pattern change of the input data.

The neural network model 50 of the present disclosure may receive input data 61 for the anomaly detection independently from the normal pattern change of the input data, and additionally receive context information 62. The context information 62 may include additional meta information for the input data. The context information 62 may include information related to how to process the input data matched with the context information 62 in the neural network model, and the neural network model 50 may differently process the input data based on the context information 62. More particularly, the neural network model 50 may obtain a character in a producing environment of the corresponding input data based on the context information 62, and process the input data according to the obtained characteristic. For example, the neural network model 50 may obtain information about manufacturing equipment, information about a manufacturing recipe, information about a characteristic of an article, information about whether a missing value exists in the input data, a missing value item, and the like based on the context information 62, and process the input data based on the additional information for the processing of the obtained input data.

In the exemplary embodiment of the present disclosure, one neural network model 50 may include an ensemble of the neural network. That is, in the present disclosure, one neural network model 50 may be configured of one neural network and may also be configured of an ensemble of one or more neural networks. That is, one neural network model in the present disclosure may be a unified neural network model. When the plurality of neural networks shares knowledge, the neural networks may be treated as one neural network model, and one neural network model may be an ensemble configuration of the plurality of neural networks. When architecture or training data of the neural network is shared, the neural network may be treated as one kind of neural network. For example, in the case where a first neural network is trained by using a first training data set and a second neural network is trained by using a second training data set (that is, the neural network model is configured for each normal state in an existing production environment), the first neural network and the second neural network may form the plurality of neural network models. However, in the exemplary embodiment of the present disclosure, even in the case where one neural network model 50 is configured of one or more neural networks, but architecture of the respective neural networks are common or training data is common, the neural network model may be the ensemble of the neural networks. Accordingly, one neural network model 50 of the present disclosure may be formed of the ensemble of one or more neural networks sharing knowledge.

The neural network model 50 of the present disclosure may be formed of a supervised learning model 60. In the exemplary embodiment of the present disclosure formed of the supervised learning model 60, the supervised learning model 60 may receive the input data 61 and the context information 62 as an input of the supervised learning model 60 and output anomaly information about the input data 61 as an output. The supervised learning model 60 may be trained by using the learning input data, the learning context information, and the anomaly information labelled to the learning input data and the learning context information.

The neural network model 50 of the present disclosure may be formed of an unsupervised learning model 65. The unsupervised learning model 65 may include a model which is capable of clustering input data. The unsupervised learning model 65 may be, for example, a model formed of a neural network that restores the input data. The unsupervised learning model 65 may include, for example, an autoencoder. The unsupervised learning model 65 may be trained by using learning input data and learning context information matched with the learning input data.

In the present exemplary embodiment of the present disclosure, data processed by using the neural network model may include all kinds of data obtained in an industrial field. For example, the data processed by using the neural network model may include an operation parameter of a device for producing a product in a producing process of the product, a sensor data obtained by an operation of a device, and the like. For example, in the case of a process using temperature setting of equipment and laser in a specific process, a wavelength of the laser and the like may be included in the kind of data processed in the present disclosure. For example, the processed data may include lot equipment history data from a Management Execution System (MES), data from equipment interface data source, processing tool recipes, processing tool test data, probe test data, electric test data, coupling measurement data, diagnosis data, remote diagnosis data, post-processing data, and the like, but the present disclosure is not limited thereto. For more particular example, the processed data may include work-in-process information including about 120,000 items for each lot obtained in a semiconductor fab, raw processing tool data, equipment interface information, process metrology information (for example, including about 1,000 items for each lot), defect information which a yield-related engineer may access, operation test information, sort information (including datalog and bitmap), and the like, but the present disclosure is not limited thereto. The description related to the foregoing kind of data is merely an example, and the present disclosure is not limited thereto. In the exemplary embodiment of the present disclosure, a computer device 100 may preprocess collected data. The computer device 100 may supplement a missing value in the collected data. For example, the computer device 100 may supplement a missing value with a median value or an average value or may also delete a row in which a plurality of missing values exists. Further, for example, in the computer device 100, a subject matter expertise of a manager may be utilized in data preprocessing by a matrix completion computer device 100. For example, the computer device 100 may remove values (for example, a value estimated as an erroneous operation of a sensor and the like) completely deviating from a boundary and a limit from the collected data. Further, the computer device 100 may also adjust a value of data so that the data maintains a characteristic and similarly has a scale. For example, the computer device 100 may also apply thermal unit standardization of data. The computer device 100 may also simplify processing by removing heat irrelevant to the anomaly detection from the data. In the exemplary embodiment of the present disclosure, the computer device 100 may perform an appropriate input data preprocessing method for easiness of the training of the neural network model for generating an anomaly detection model and the anomaly detection. The descriptions of the particular example of the kind of input data, examples, preprocessing, transformation, and the like are specifically discussed in U.S. patent application Ser. No. 10/194,920 (filed on Jul. 12, 2002), the entirety of which is incorporated herein by reference.

Figure 4:
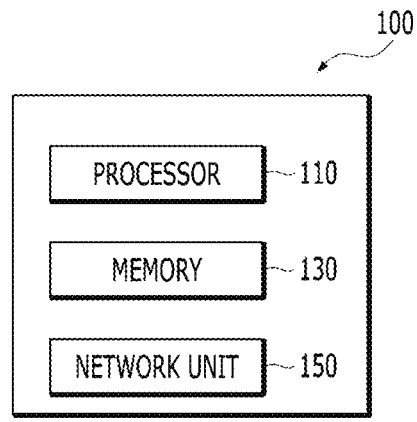
FIG. 4 is a block diagram illustrating a computer device for performing a method of anomaly detection according to an exemplary embodiment of the present disclosure.

FIG. 4 is a block diagram illustrating a computer device for performing a method of anomaly detection according to an exemplary embodiment of the present disclosure.

The configuration of the computer device 100 illustrated in FIG. 4 is merely a simplified example. In the exemplary embodiment of the present disclosure, in the computer device 100, other configurations for performing a computing environment of the computer device 100 may be included, and only a part of the disclosed configurations may also configure the computer device 100.

The computer device 100 may include a processor 110, a memory 130, and a network unit 150.

The processor 110 may be formed of one or more cores, and may include a processor for analyzing data and deep learning, such as a Central Processing Unit (CPU), a General Purpose Graphics Processing Unit (GPGPU), and a Tensor Processing Unit (TPU) of a computing device. The processor 110 may perform an anomaly detecting method according to an exemplary embodiment of the present disclosure by reading a computer program stored in the memory 130.

According to the exemplary embodiment of the present disclosure, the processor 110 may perform a calculation for training a neural network. The processor 110 may perform a calculation, such as processing of input data for learning in Deep Learning (DN), extraction of a feature from input data, error calculation, update of a weighted value of a neural network by using backpropagation, for training a neural network. At least one of the CPU, GPGPU, and the TPU of the processor 110 may process learning of a network function. For example, the CPU and the GPGPU may process learning of a network function and data classification by using the network function together. Further, in the exemplary embodiment of the present disclosure, the learning of the network function and the data classification by using the network function may be processed by using the processors of the plurality of computer devices together. Further, the computer program executed in the computing device according to the exemplary embodiment of the present disclosure may be a CPU, GPGPU, or TPU executable program.

The computing device 100 in the exemplary embodiment of the present disclosure may distribute and process a network function by using at least one of the CPU, the GPGPU, and the TPU. Further, in the exemplary embodiment of the present disclosure, the computer device 100 may also distribute and process a network function together with another computer device. The description for the particular contents related to the distribution and the processing of the network function of the computer device 100 is particularly discussed in U.S. patent application Ser. No. 15/161,080 (filed on May 20, 2016) and Ser. No. 15/217,475 (filed on Jul. 22, 2016), the entirety of which is incorporated herein by reference.

The processor 110 may obtain input data based on sensor data obtained during the manufacturing of an article by using one or more manufacturing recipes in one or more manufacturing equipment. The input data in the exemplary embodiment of the present disclosure may include all kinds of data obtained in an industrial field. For example, the data processed by using the neural network model may include an operation parameter of a device for producing a product in a producing process of the product, sensor data obtained by an operation of a device, and the like. One input data may include data obtained during the manufacturing of an article by using one manufacturing recipe in one manufacturing equipment. The data obtained during the manufacturing of the article may include sensor data. That is, an input data set including the entire input data may include the data obtained during the manufacturing of the article by using one or more manufacturing recipes in one or more manufacturing equipment (that is, the data for several manufacturing equipment and several manufacturing recipes may co-exist, so that the data may have a plurality of normal states), but each input data, which is the data obtained in the production of the article by one manufacturing recipe in one manufacturing equipment, may have one normal state.

In the exemplary embodiment of the present disclosure, the manufacturing equipment may include predetermined manufacturing equipment for producing an article in an industrial field, and include, for example, semiconductor manufacturing equipment, but the present disclosure is not limited thereto.

In the exemplary embodiment of the present disclosure, the manufacturing recipe may be formed of a method of producing an article in an industrial field, and more particularly, may include data for controlling manufacturing equipment. In the exemplary embodiment of the present disclosure, the manufacturing recipe may include, for example, a semiconductor manufacturing recipe loaded to manufacturing equipment, but the present disclosure is not limited thereto.

The processor 110 may input the input data to the neural network model 50 loaded to the computer device 100. The neural network model 50 may be formed of one neural network model which is capable of performing the anomaly detection on the plurality of normal states as described above. The neural network model may include, for example, a neural network function selected from the group consisting of an Auto Encoder (AE), a Denoising Auto encoder (DAE), a Variational Auto Encoder (VAE), but the present disclosure is not limited thereto, and the neural network model may include a predetermined neural network function which is capable of classifying or clustering the input data. In the exemplary embodiment of the present disclosure, in the neural network model, for an additional input of a context indicator or a context characteristic indicator, an encoding layer and a decoding layer may be asymmetric (for example, the number of nodes of an input layer of the encoding layer may be larger than the number of nodes of an output layer by the number of items of the context indicator or the context characteristic indicator).

In the exemplary embodiment of the present disclosure, the processor 110 may match the context indicator 300 which associates the input data 200 with at least one of the manufacturing recipe and the manufacturing equipment with the input data and input the context indicator 300 to the neural network model 50.

The context indicator 300 may include information indicating whether the input data includes the sensor data obtained during the manufacturing of the article by a specific manufacturing recipe and/or information indicating whether the input data includes the sensor data obtained during the manufacturing of the article by specific manufacturing equipment. For example, the context indicator may perform a function of an identifier for at least one of the manufacturing recipe and the manufacturing equipment. The context indicator may include a one hot vector including a sparse representation for at least one of one manufacturing recipe among one or more manufacturing recipes and one manufacturing equipment among one or more manufacturing equipment. For example, referring to the example illustrated in FIG. 6, in a one hot vector representation 301 of the context indicator, when corresponding input data is data obtained based on recipe A, in order to represent that the corresponding input data is based on recipe A, the one hot vector representation 301 of the context indicator may be the vector representation having a value of 1 only for recipe A and having a value of 0 for the remaining recipes. When the one hot vector representation 301 of the context indicator is related to a recipe, the one hot vector representation 301 of the context indicator may have a value of 1 for a manufacturing recipe of corresponding input data and have a value of 0 for the remaining recipes, and when the one hot vector representation 301 of the context indicator is related to manufacturing equipment, the one hot vector representation 301 of the context indicator may have a value of 1 for manufacturing equipment of corresponding input data and have a value of 0 for the remaining manufacturing equipment. When the one hot vector representation 301 of the context indicator is related to manufacturing equipment and a recipe, the one hot vector representation 301 of the context indicator may have a value of 1 for a recipe and manufacturing equipment to which corresponding input data corresponds, and a value of 0 for the remainder, and in this case, the context indicator may be formed of a one hot vector for the manufacturing recipe and a one hot vector for the manufacturing equipment. The description of the foregoing one hot vector representation 301 of the context indicator is merely an example, and the present disclosure is not limited thereto.

The processor 110 may input the context indicator 300 matched with the input data 200 to a predetermined layer of the neural network model 50. The processor 110 may input the context indicator 300 matched with the input data 200 to the input layer or an intermediate layer 53 of the neural network model 50. As described above, the neural network model 50 may include an auto encoder including an encoding layer 51 which is capable of performing encoding processing on the input data, and a decoding layer 55 which is capable of performing decoding processing on the input data. The intermediate layer 53 is a layer located in a connection portion of the encoding layer 51 and the decoding layer 55 and may be the layer having the smallest number of nodes, and may also be referred to as a bottleneck layer. The auto encoder model of the exemplary embodiment of the present disclosure may include the encoding layer 51 performing a reduction of dimensionality (that is, encoding) on the input data, and a layer performing restoration of dimensionality (that is, decoding) on the input data. The output of the auto encoder may be similar to the input data.

The processor 110 may also preprocess the context indicator 300 and input the preprocessed context indicator 300 to the neural network model 50. The processor 110 may preprocess the context indicator 300 by using a first preprocessing neural network 310 by inputting the context indicator 300 to the first preprocessing neural network 310. The processor 110 may also input the context indicator preprocessed by using the first preprocessing neural network 310 to the neural network model. The preprocessed context indicator may be a dense representation of the context indicator. The preprocessed context indicator may be formed of, for example, a feature of the context indicator. For example, when the first preprocessing neural network 310 is an encoder, the preprocessed context indicator may be an encoded representation for the context indicator. The description of the foregoing preprocessed neural network model and dense representation of the preprocessed context indicator are merely examples, and the present disclosure is not limited thereto.

The processor 110 may input the preprocessed context indicator 300 matched with the input data 200 to a predetermined layer of the neural network model 50. The processor 110 may input the preprocessed context indicator 300 matched with the input data 200 to the input layer or the intermediate layer 53 of the neural network model 50.

The processor 110 may match a context characteristic indicator 400 which associates the input data with at least one of the manufacturing characteristic of the manufacturing recipe and the manufacturing characteristic of the manufacturing equipment with the input data 200 and input the matched context characteristic indicator 400 to the neural network model 50. The processor 110 may input the context characteristic indicator 400 matched with the input data 200 to a predetermined layer of the neural network model 50.

The context characteristic indicator 400 may include a more detailed representation for representing context of the input data. For example, the context characteristic indicator 400 may include additional detailed information about at least one of the manufacturing recipe and the manufacturing equipment. The context characteristic indicator 400 may include more detailed information than the context indicator 300 related to the manufacturing recipe, as well as the kind of manufacturing recipe, or more detailed information than context indicator 300 related to the manufacturing equipment, as well as the manufacturing equipment. For example, the context characteristic indicator 400 may include information related to a raw material used in the manufacturing recipe. Further, for example, the context characteristic indicator may include information related to a specification of the manufacturing equipment, the kind of manufacturing parameter, the kind of sensor data measured in the manufacturing equipment, and the like. Further, for example, the context characteristic indicator may include additional information about the input data. For example, in the case where a plurality of items is present in the input data, the context characteristic indicator may include information about which item value among the values of the plurality of items is actual data and which item value is a missing value.

The context characteristic indicator may include a vector representation for at least one of one manufacturing recipe among one or more manufacturing recipes and one manufacturing equipment among one or more manufacturing equipment. Further, for example, the context characteristic indicator may include a binary vector including a low-dimensional dense representation for at least one of one manufacturing recipe among one or more manufacturing recipes and one manufacturing equipment among one or more manufacturing equipment. As described above, the context characteristic indicator may be formed of, for example, a binary vector representing a characteristic for a specific manufacturing recipe. Further, as described above, the context characteristic indicator may be formed of, for example, a binary vector representing a characteristic for specific manufacturing equipment.

For example, the context characteristic indicator may represent a characteristic of the manufacturing recipe. In this case, for example, the context characteristic indicator may represent whether a specific material is included in the manufacturing recipe, the number of specific materials (for example, volume, mass, and the number). Further, for example, the context characteristic indicator may represent a characteristic of the manufacturing equipment. In this case, for example, the context characteristic indicator may represent whether a specific operation parameter exists in the manufacturing equipment, whether a process is included, a normal operation parameter range in the process, and the like. The particular description of the foregoing context characteristic indicator for the manufacturing recipe or the manufacturing equipment is merely an example, and the present disclosure is not limited thereto.

The context characteristic indicator represents the characteristic for at least one of the manufacturing recipe and the manufacturing equipment, and in order to represent detailed information about the characteristic of the manufacturing recipe and the manufacturing equipment, the context characteristic indicator may have an appropriate predetermined vector form (for example, a binary vector form in the case of representing whether a specific item is included, and a real vector form in the case of representing the number of specific items). The foregoing vector form of the context characteristic indicator is merely an example, and the present disclosure is not limited thereto.

Figure 10:
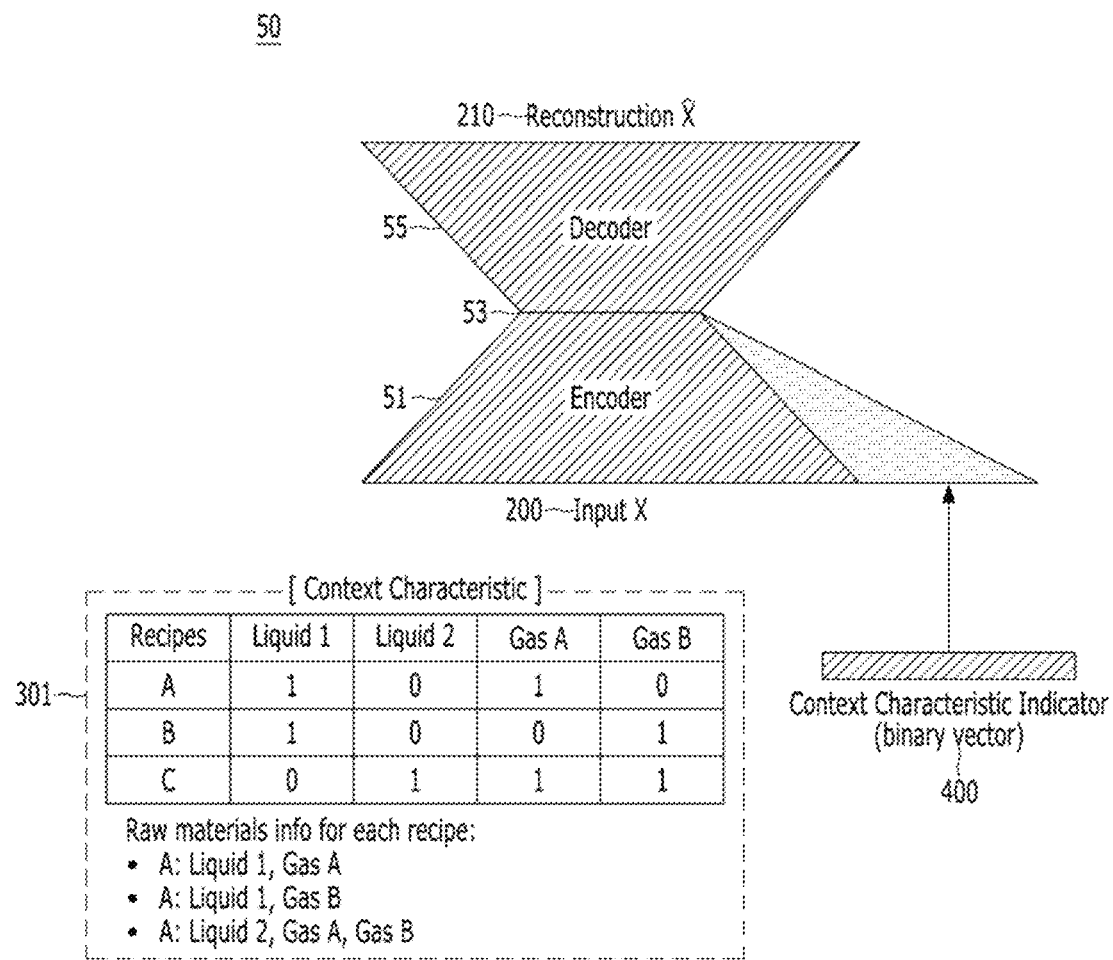
FIG. 10 is a schematic diagram illustrating a neural network model for anomaly detection according to a fifth exemplary embodiment of the present disclosure.

For example, referring to the example illustrated in FIG. 10, in a binary vector representation 401 of the context characteristic indicator, the binary vector representation 401 of the context characteristic indicator may represent that a first liquid and gas A are used in recipe A, the first liquid and gas B are used in recipe B, and a second liquid, gas A, and gas B are used in recipe C. That is, the context characteristic indicator 400 is the binary vector, and may represent more detailed information about at least one of the manufacturing recipe and the manufacturing equipment.

Figure 16:
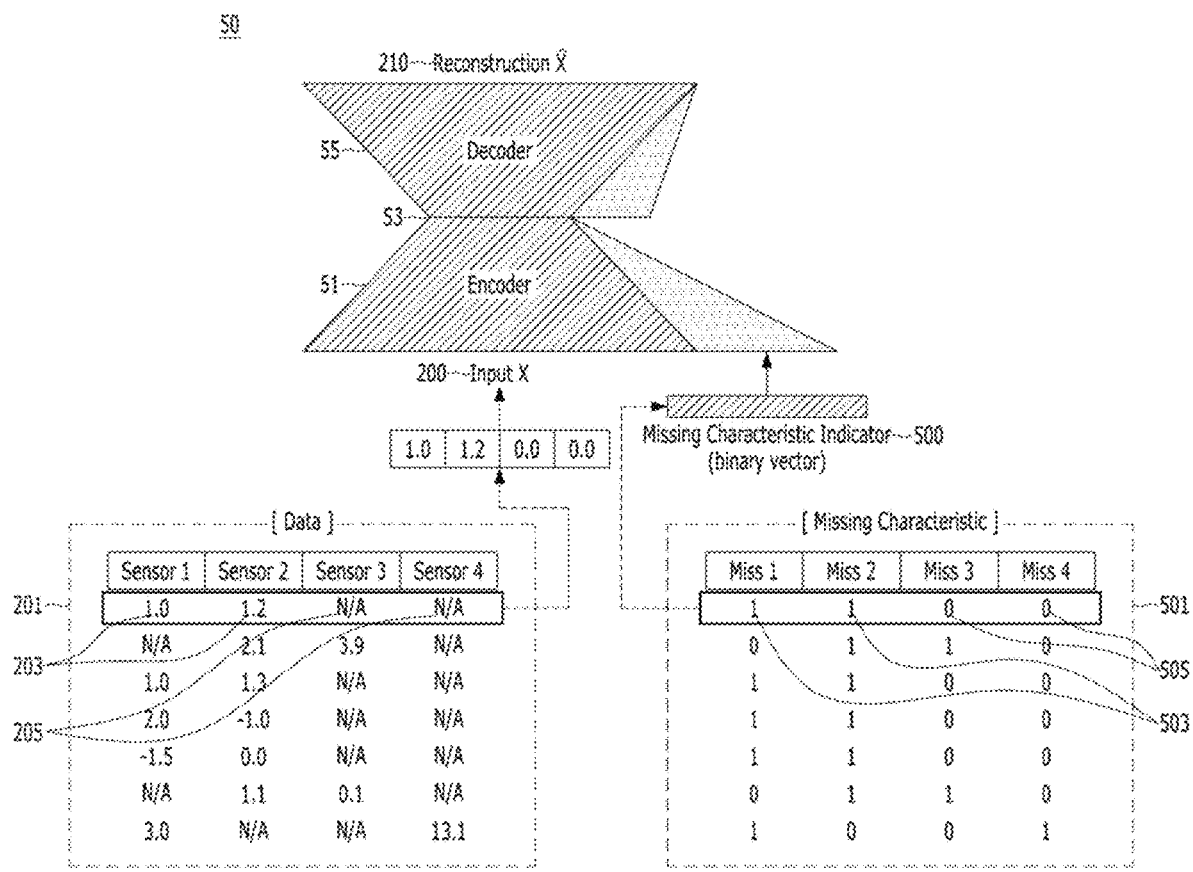
FIG. 16 is a schematic diagram illustrating a neural network model for anomaly detection according to an eleventh exemplary embodiment of the present disclosure.

For example, referring to the example illustrated in FIG. 16, the context characteristic indicator 400 may include a missing characteristic indicator 500 representing a missing value. The missing characteristic indicator 500 may be a binary vector representing a missing item of the input data so that the neural network model 50 may identify which item's value in the input data is an actual value and which item's value is a correction value of a missing value with other data (for example, in the example of FIG. 16, for the item having a value of 0, the neural network model 50 may recognize through the missing characteristic indicator whether the actual data is 0 or the item value is processed as 0 because of a missing value). In the case where item values of items 203 of sensor 1 and sensor 2 in first input data 201 are actual data and item values of items 205 of sensor 3 and sensor 4 are missing data (for example, in the case where there is no corresponding sensor in the manufacturing equipment measuring sensor data), a binary vector representation 501 of the missing characteristic indicator in the example of illustrated in FIG. 16 may be a binary vector having 1 as an item of an actual value like reference numeral 503 in the example of FIG. 16 and 0 as an item of a missing value like reference numeral 505 in the example of FIG. 16. The foregoing binary vector representation of the missing characteristic indicator is merely an example, and the present disclosure is not limited thereto.

The processor 110 may input the context characteristic indicator 400 matched with the input data 200 to at least one of the input layer or the intermediate layer 53 of the neural network model 50.

The processor 110 may also preprocess the context characteristic indicator 400 and input the preprocessed context characteristic indicator 400 to the neural network model 50. The processor 110 may input the context characteristic indicator 400 to a second preprocessing neural network 410 and preprocess the context characteristic indicator 400 by using the second preprocessing neural network 410. The processor 110 may input the context characteristic indicator preprocessed by using the second preprocessing neural network 410 to the neural network model. The preprocessed context characteristic indicator may be a dense representation of the context characteristic indicator. The preprocessed context characteristic indicator may be formed of, for example, a feature of the context characteristic indicator. For example, in the case where the second preprocessing neural network 410 is an encoder, the preprocessed context characteristic indicator may be a representation encoded for the context characteristic indicator. The description of the foregoing preprocessed neural network model and dense representation of the preprocessed context characteristic indicator are merely examples, and the present disclosure is not limited thereto.

The processor 110 may input the preprocessed context characteristic indicator 400 matched with the input data 200 to a predetermined layer of the neural network model 50.

The processor 110 may input the preprocessed context characteristic indicator 400 matched with the input data 200 to the input layer or the intermediate layer 53 of the neural network model 50.

The processor 110 may process the input data by using the neural network model and generate an output.

The processor 110 may help the neural network model to differently process the input data based on at least one of the context indicator 300 and the context characteristic indicator 400. The neural network model 50 may differently process the input data according to at least one of the context indicator 300 and the context characteristic indicator 400 by calculating at least one of the context indicator 300 and the context characteristic indicator 400 together with the input data. The neural network model 50 calculates at least one of the context indicator 300 and the context characteristic indicator 400 together with the input data, so that at least one of the context indicator 300 and the context characteristic indicator 400 may influence the calculation of the input data by the neural network model, and thus the input data may be differently processed in the neural network model according to at least one of the context indicator 300 and the context characteristic indicator 400.

In the exemplary embodiment of the present disclosure, the neural network model 50 may be configured to differently process each input data based on each context indicator matched with each input data. In the exemplary embodiment of the present disclosure, the neural network model may specify at least one of the manufacturing equipment and the manufacturing recipe by the context indicator 300. The neural network model may specify one or all of one manufacturing equipment among one or more manufacturing equipment and one manufacturing recipe among one or more manufacturing recipes based on each context indicator matched with each input data. The neural network model specifies at least one of the manufacturing equipment and the manufacturing recipe of the input data based on the context indicator matched with the input data, thereby processing the input data based on at least one of the specified manufacturing equipment or manufacturing recipe. The neural network model may associate the input data with at least one of the manufacturing equipment and the manufacturing recipe based on the context indicator matched with the input data to process the input data. In the exemplary embodiment of the present disclosure, the association of the input data with at least one of the manufacturing equipment and the manufacturing recipe may be based on relevancy between the input data trained in the neural network model and the vector representation of the context indicator. That is, in the exemplary embodiment of the present disclosure, the neural network model may perform the anomaly detection on the input data having a plurality of normal states of the input data based on various manufacturing equipment and various manufacturing recipes.

In the exemplary embodiment of the present disclosure, the neural network model 50 may be configured to differently process respective input data based on each context characteristic indicator matched with each input data. In the exemplary embodiment of the present disclosure, the neural network model may differently process respective input data based on material characteristic information about an article obtained based on each context characteristic indicator matched with each input data. The neural network model 50 may obtain knowledge for at least one of a characteristic of the manufacturing equipment and a characteristic of the manufacturing recipe of each input data based on each context characteristic indicator matched with each input data. The neural network model 50 may differently process the input data based on the knowledge obtained based on the context characteristic indicator.

The neural network model 50 may specify whether each of the items included in the input data is an actual value or a missing value based on the missing characteristic indicator 500, and the neural network model 50 may differently process the input data based on the information about the identified missing value items.

The processor 110 may detect am anomaly for the input data based on output data 210 of the neural network model. The anomaly may include a predetermined anomaly state occurable in the manufacturing environment. In the exemplary embodiment of the present disclosure, for example, the anomaly may include all or one of article anomaly for an article and manufacturing equipment anomaly for one or more manufacturing equipment. Further, in the exemplary embodiment of the present disclosure, for example, the anomaly may include anomaly during the manufacturing detected by sensor data when the article is produced in one or more manufacturing equipment. Further, in the exemplary embodiment of the present disclosure, the anomaly may also include anomaly prediction information about the manufacturing equipment.

The neural network model of the present disclosure may include a predetermined neural network model operable so as to generate the input data as an output. For example, the neural network model of the present disclosure may include an auto encoder capable of restoring input data, a Generative Adversarial Network (GAN) generating a similar output to the input data, a U-network, a neural network model formed of a combination of a convolutional network and a deconvolutional network, and the like. That is, the neural network model of the present disclosure is trained to output output data close to the input data and is trained only with normal data, so that in the case where the input data is normal data including no anomaly, the output data may be similar to the input data. In the case where anomaly data is input to the neural network model of the present disclosure, the neural network model of the present disclosure is not trained for the restoration of an anomaly pattern, so that the output data may not be similar to the input data compared to the output when the normal data is received as an input. That is, the pre-trained neural network model of the present disclosure may detect novelty for an anomaly pattern that is not trained from the input data, so that the novelty may represent a reconstruction error of the output data for the input data. When the reconstruction error exceeds a predetermined threshold value, the processor 110 may determine that the input data includes the untrained pattern (that is, the anomaly pattern) to detect that the input data includes anomaly.

In the exemplary embodiment of the present disclosure, the neural network model 50 may be trained to restore the input data 200. The neural network model 50 may be trained to generate the same output data 210 as the input data 200. In the exemplary embodiment of the present disclosure, the neural network model 50 may receive at least one of the context indicator and the context characteristic indicator in addition to the input data and be trained so as to restore the input data and the additional input data during the training process.

In another exemplary embodiment of the present disclosure, the neural network model 50 may be first-trained so as to restore input data, and receive at least one of the context indicator and the context characteristic indicator in addition to the input data and be second-trained so as to restore the input data and the additional input data.

As described above, according to the exemplary embodiment of the present disclosure, in order to perform the anomaly detection independently from a normal pattern change of the input data, the unified neural network model may be utilized for processing the input data having the plurality of normal states. In the case where the unified neural network is utilized for processing the input data having the plurality of normal states, it is possible to secure sufficient training data for training the neural network model compared to the case of using the neural network model separated for each normal pattern, thereby obtaining a more generalized result. Further, by using the unified neural network model, it is possible to prevent inefficiency for the training of the model occurable in a complex producing environment, and the neural network model may obtain the correlation between the respective normal states of the input data and common knowledge in the respective normal states to obtain more generalized performance.

Figure 5:
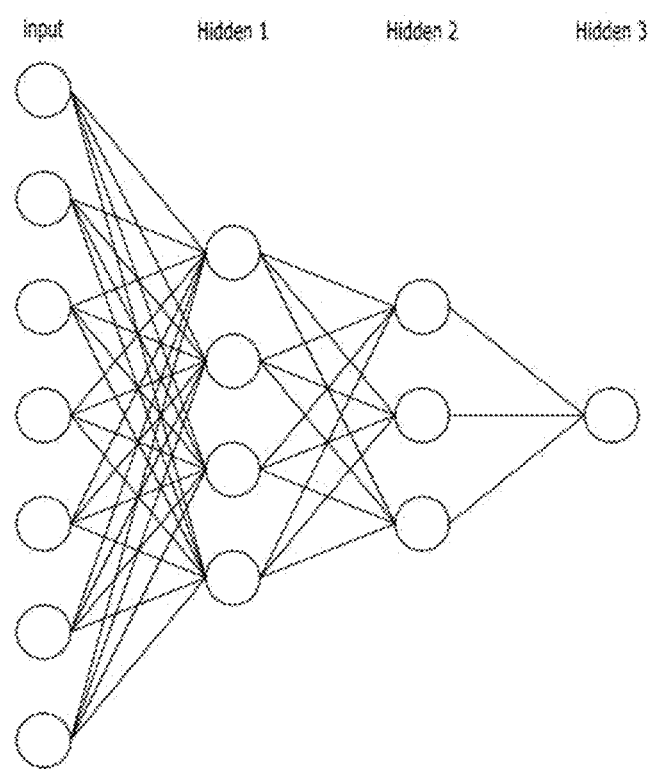
FIG. 5 is a schematic diagram illustrating a network function according to an exemplary embodiment of the present disclosure.

FIG. 5 is a schematic diagram illustrating a neural network model according to an exemplary embodiment of the present disclosure.

Throughout the present specification, a calculation model, a nerve network, a network function, and a neural network may be used as the same meaning. The neural network may generally be formed of a set of connected calculation units referable as "nodes". The "nodes" may also be called "neurons". The neural network includes one or more nodes. The nodes (or neurons) forming the neural networks may be connected with each other by one or more "links".

Within the neural network, one or more nodes connected through the link may relatively form a relationship between an input node and an output node. The concept of the input node is relative to the concept of the output node, and a predetermined node having an output node relationship with respect to one node may have an input node relationship in a relationship with another node, and a reverse relationship is also available. As described above, the relationship between the input node and the output node may be generated based on a link. One or more output nodes may be connected to one input node through a link, and a reverse case may also be valid.

In the relationship between an input node and an output node connected through one link, a value of the output node may be determined based on data input to the input node. Herein, a node connecting the input node and the output node may have a weight. A weight may be variable, and may be varied by a user or an algorithm in order to perform a function desired by a neural network. For example, when one or more input nodes are connected to one output node by links, respectively, a value of the output node may be determined based on values input to the input nodes connected to the output node and weight set in the link corresponding to each of the input nodes.

As described above, in the neural network, one or more nodes are connected through one or more links to form a relationship of an input node and an output node within the neural network. A characteristic of the neural network may be determined according to the number of nodes and links, a relation between the nodes and the links, and a value of a weight assigned to each of the links within the neural network. For example, when there are two neural networks, which have the same number of nodes and the same number of links and have different weight values between the links, the two neural networks may be recognized to be different from each other.

The neural network may consist of one or more nodes. Some of the nodes forming the neural network may form one layer based on distances from an initial input node. For example, a set of nodes having a distance of n from an initial input node may form n layers. The distance from the initial input node may be defined by the minimum number of links, which needs to be passed from the initial input node to a corresponding node. However, the definition of the layer is arbitrary for explanation, and a degree of the layer within the neural network may be defined with a different method from the foregoing method. For example, the layers of the nodes may be defined by a distance from a final output node.

The initial input node may mean one or more nodes, to which data is directly input without passing a link in a relationship with other nodes among the nodes within the neural network. Otherwise, the initial input node may mean nodes having no other input node connected through the links in a relationship between the nodes based on a link within the neural network. Similarly, the final output node may mean one or more nodes having no output node in the relationship with other nodes among the nodes within the neural network. Further, a hidden node may mean a node, not the initial input node and the final output node, forming the neural network. In the neural network in the exemplary embodiment of the present disclosure, the number of nodes of the input layer may be the same as the number of the nodes of the output layer, and the neural network may have the form in which the number of nodes is decreased and increased again according to the progress from the input layer to the hidden layer. Further, in the neural network according to another exemplary embodiment of the present disclosure, the number of nodes of the input layer may be smaller than the number of nodes of the output layer, and the neural network may have the form in which the number of nodes is decreased according to the progress from the input layer to the hidden layer. Further, in the neural network according to another exemplary embodiment of the present disclosure, the number of nodes of the input layer may be larger than the number of nodes of the output layer, and the neural network may have the form in which the number of nodes is increased according to the progress from the input layer to the hidden layer. The neural network according to another exemplary embodiment of the present disclosure may have the form in which the foregoing neural networks are combined.

A Deep Neural Network (DNN) may mean a neural network including a plurality of hidden layers, in addition to an input layer and an output layer. When the DNN is used, it is possible to recognize a latent structure of data. That is, it is possible to recognize a latent structure of a picture, text, a video, a voice, and music (for example, whether a specific object is included in a picture, contents and emotion of the text, and contents and feeling of the voice). The DNN may include a Convolutional Neural Network (CNN), a Recurrent Neural Network (RNN), an auto encoder, Generative Adversarial Networks (GAN), a Restricted Boltzmann Machine (RBM), a Deep Belief Network (DBN), a Q network, a U network, a Siamese network, and the like. The description of the foregoing DNN is merely an example, and the present disclosure is not limited thereto.

In the exemplary embodiment of the present disclosure, the neural network model may also include an auto encoder. The auto encoder may be a kind of artificial neural network for outputting output data similar to input data. The auto encoder may include at least one hidden layer, and the odd number of hidden layers may be disposed between the input and output layers. The number of nodes in each layer may be reduced from the number of nodes in the input layer to an intermediate layer called a bottleneck layer (encoding), and then expanded from the bottleneck layer to the output layer (symmetric to the input layer) symmetrically to the reduction. In this case, nodes of a dimensionality reducing layer and a dimensionality restoring layer may also be symmetric or may not be symmetric. The auto encoder may perform nonlinear dimensionality reduction. The number of input layers and the number of output layers may correspond to the number of sensors left after the preprocessing of the input data. In the auto encoder structure, the number of nodes of the hidden layer included in the encoder may have a structure that decreases away from the input layer. When the number of nodes of the bottleneck layer (the layer having the fewest nodes located between the encoder and the decoder) is too small, the sufficient amount of information may not be transferred, so that the specific number or more of nodes (for example, a half or more of the nodes of the input layer) may also be maintained.

The neural network may be learned by at least one scheme of supervised learning, unsupervised learning, and semi-supervised learning. The learning of the neural network is for the purpose of minimizing an error of an output. In the learning of the neural network, training data is repeatedly input to the neural network and an error of an output of the neural network for the training data and a target is calculated, and the error of the neural network is back-propagated in a direction from an output layer to an input layer of the neural network in order to decrease the error, and a weight of each node of the neural network is updated. In the case of the supervised learning, training data labelled with a correct answer (that is, labelled training data) is used, in each training data, and in the case of the unsupervised learning, a correct answer may not be labelled to each training data. That is, for example, the training data in the supervised learning for data classification may be data, in which category is labelled to each of the training data. The labelled training data is input to the neural network and the output (category) of the neural network is compared with the label of the training data to calculate an error. For another example, in the case of the unsupervised learning related to the data classification, training data that is the input is compared with an output of the neural network, so that an error may be calculated. The calculated error is back-propagated in a reverse direction (that is, the direction from the output layer to the input layer) in the neural network, and a connection weight of each of the nodes of the layers of the neural network may be updated according to the backpropagation. A variation rate of the updated connection weight of each node may be determined according to a learning rate. The calculation of the neural network for the input data and the backpropagation of the error may configure a learning epoch. The learning rate is differently applicable according to the number of times of repetition of the learning epoch of the neural network. For example, at the initial stage of the learning of the neural network, a high learning rate is used to make the neural network rapidly secure performance of a predetermined level and improve efficiency, and at the latter stage of the learning, a low learning rate is used to improve accuracy.

In the learning of the neural network, the training data may be generally a subset of actual data (that is, data to be processed by using the learned neural network), and thus an error for the training data is decreased, but there may exist a learning epoch, in which an error for the actual data is increased. Overfitting is a phenomenon, in which the neural network excessively learns training data, so that an error for actual data is increased. For example, a phenomenon, in which the neural network learning a cat while seeing a yellow cat cannot recognize cats, other than a yellow cat, as cats, is a sort of overfitting. Overfitting may act as a reason of increasing an error of a machine learning algorithm. In order to prevent overfitting, various optimizing methods may be used. In order to prevent overfitting, a method of increasing training data, a regularization method, a dropout method of omitting a part of nodes of the network during the learning process, and the like may be applied.

Figure 6:
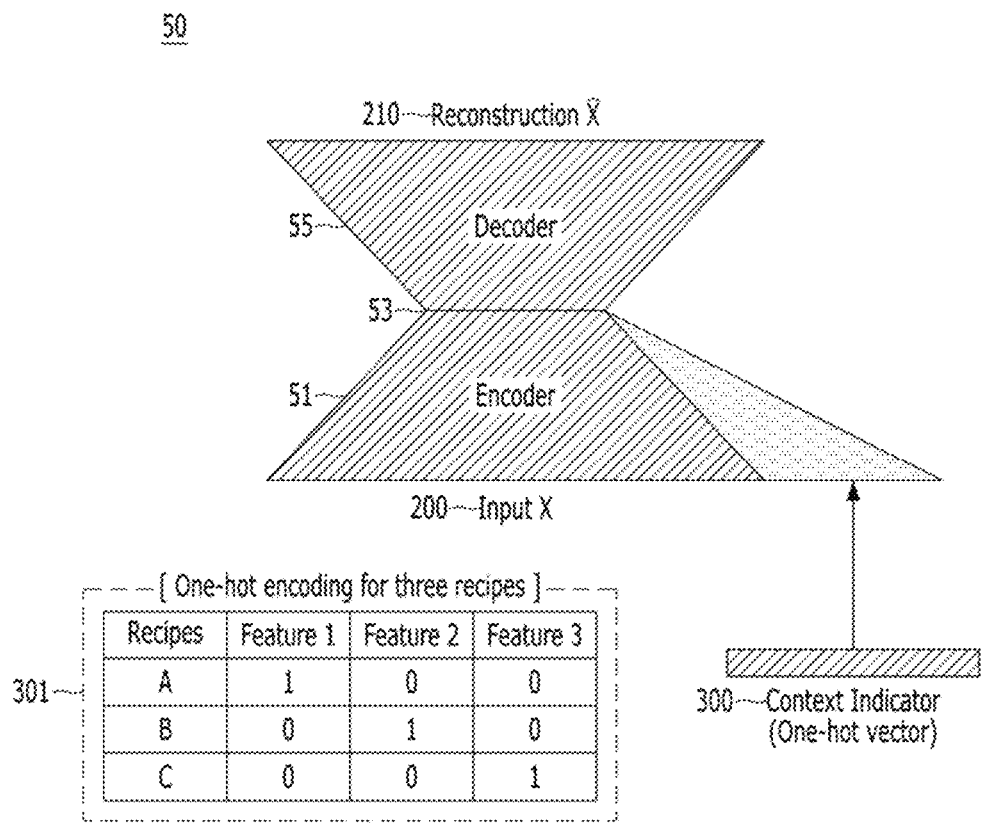
FIG. 6 is a schematic diagram illustrating a neural network model for anomaly detection according to a first exemplary embodiment of the present disclosure.

FIG. 6 is a schematic diagram illustrating a neural network model for anomaly detection according to a first exemplary embodiment of the present disclosure.

In the first exemplary embodiment of the present disclosure, the processor 110 may input input data 200 and a context indicator 300 to an input layer of a neural network model 50. In this case, the neural network model 50 may utilize information associated with the input data by the context indicator in dimensionality reduction processing (for example, encoding and feature extraction) on the input data.

As described above, the neural network model 50 may include an encoding layer 51 performing dimensionality reduction on the input data, a decoding layer 55 performing dimensionality restoration on the input data and generating output data in which the input data is restored, and an intermediate layer 53 connected with an encoder and a decoder.

In the first exemplary embodiment of the present disclosure, the neural network model 50 may include an additional node in the input layer in order to receive the context indicator in addition to the input data. In the neural network model of the first exemplary embodiment of the present disclosure, the encoder and the decoder may be asymmetric, and in this case, the neural network of the first exemplary embodiment may restore the input data. In this case, output data 210 may be data similar to the input data.

In the neural network model of the first exemplary embodiment of the present disclosure, the encoder and the decoder may also be asymmetric, and in this case, the neural network of the first exemplary embodiment may restore the input data and the context indicator. In this case, the output data 210 may also be data similar to the input data and the context indicator.

The context indicator 300 may be formed of a one hot vector including a sparse representation for at least one of one manufacturing recipe among one or more manufacturing recipes and one manufacturing equipment among one or more manufacturing equipment, and the one hot vector representation 301 of the indicator has been described above, so that a description thereof will be omitted.

Figure 7:
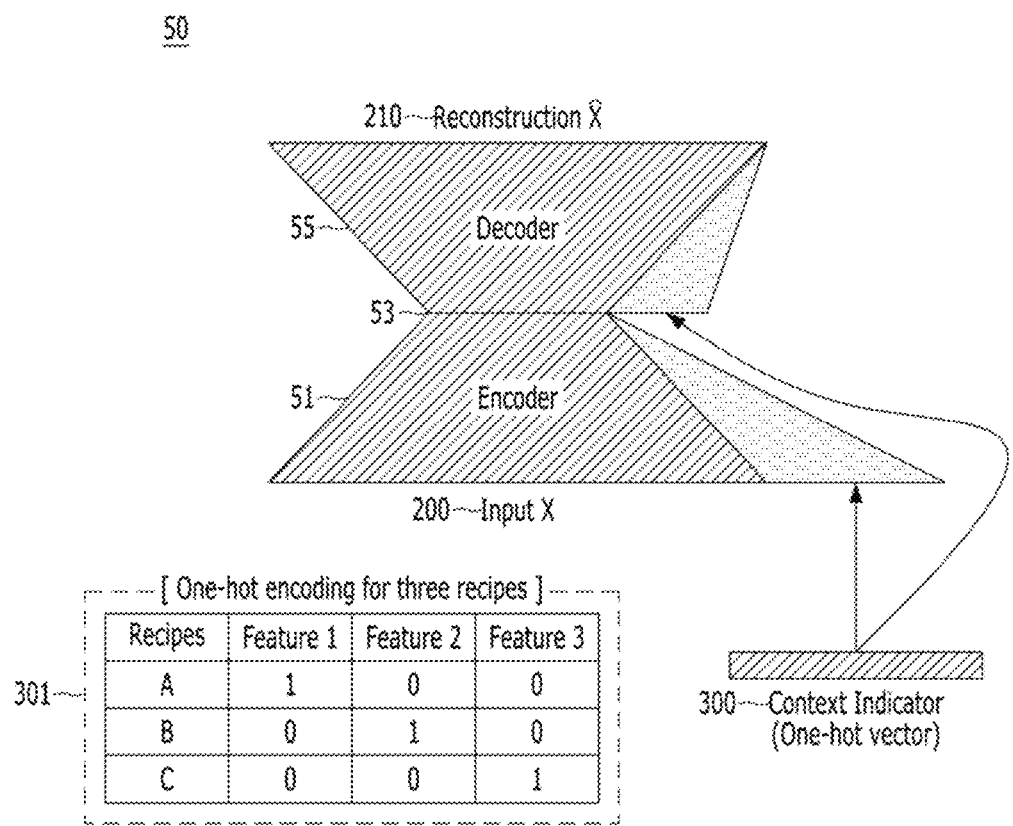
FIG. 7 is a schematic diagram illustrating a neural network model for anomaly detection according to a second exemplary embodiment of the present disclosure.

FIG. 7 is a schematic diagram illustrating a neural network model for anomaly detection according to a second exemplary embodiment of the present disclosure.

In the second exemplary embodiment of the present disclosure, the processor 110 may input input data 200 to an input layer and additionally input a context indicator 300 to an intermediate layer 53 of a neural network model 50 or the input layer and the intermediate layer 53. In this case, the neural network model 50 may utilize characteristic information associated with the input data by the context indicator in dimensionality restoration processing (for example, decoding) or dimensionality restoration processing and dimensionality reduction processing for the input data.

In the second exemplary embodiment of the present disclosure, the neural network model 50 may include an additional node in the input layer or the intermediate layer (or a partial layer of a decoder) in order to receive the context indicator in addition to the input data. In the neural network model of the second exemplary embodiment of the present disclosure, an encoder and the decoder may be asymmetric, and in this case, the neural network of the second exemplary embodiment may restore the input data. In this case, output data 210 may be data similar to the input data.

In the neural network model of the second exemplary embodiment of the present disclosure, the encoder and the decoder may also be asymmetric, and in this case, the neural network of the second exemplary embodiment may restore the input data and the context indicator. In this case, the output data 210 may also be data similar to the input data and the context indicator.

Figure 8:
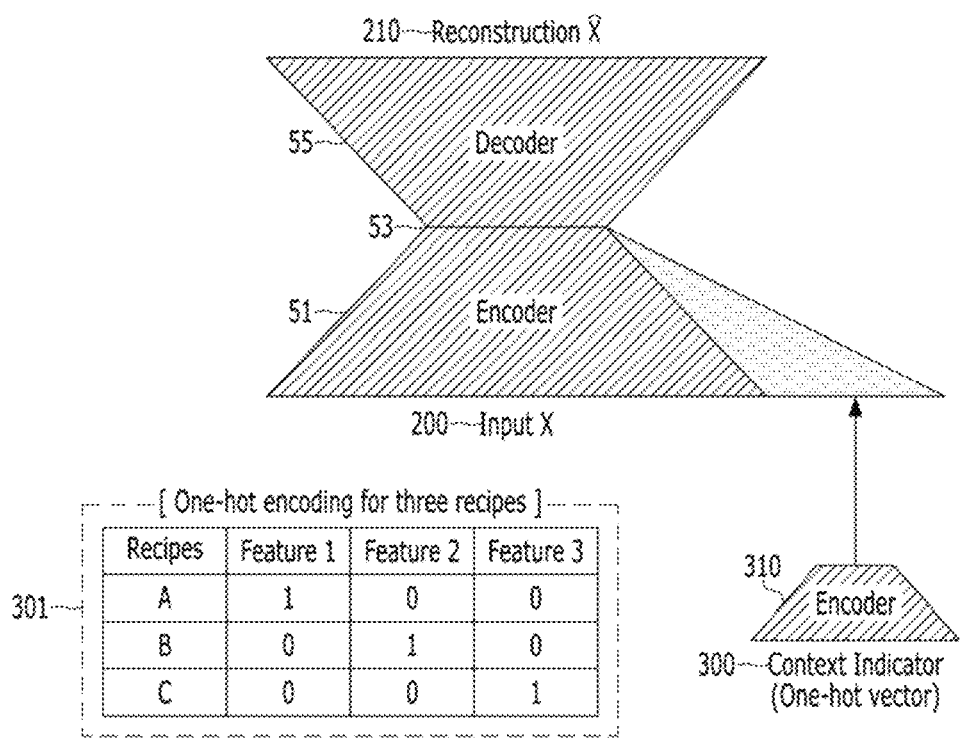
FIG. 8 is a schematic diagram illustrating a neural network model for anomaly detection according to a third exemplary embodiment of the present disclosure.

FIG. 8 is a schematic diagram illustrating a neural network model for anomaly detection according to a third exemplary embodiment of the present disclosure.

In the third exemplary embodiment of the present disclosure, a processor 110 may preprocess a context indicator 300 with a first preprocessing neural network 310 and input the preprocessed context indicator to an input layer of a neural network model 50. In this case, the neural network model 50 may utilize information associated with input data by the preprocessed context indicator in dimensionality reduction processing (for example, encoding and feature extraction) for the input data.

In the third exemplary embodiment of the present disclosure, the context indicator is preprocessed and then is input to the neural network model 50, so that it is possible to lighten the calculation of the neural network model 50. Further, the preprocessed context indicator is formed of a dense representation of the context indicator, so that the processor 110 may more easily process association with at least one of a manufacturing recipe and manufacturing equipment of the input data when the input data is calculated by using the neural network model 50.

In the third exemplary embodiment of the present disclosure, the first preprocessing neural network 310 may also be trained at the same time when the neural network model 50 is trained, and may also be first separately trained and then be utilized in the training of the neural network model 50.

Figure 9:
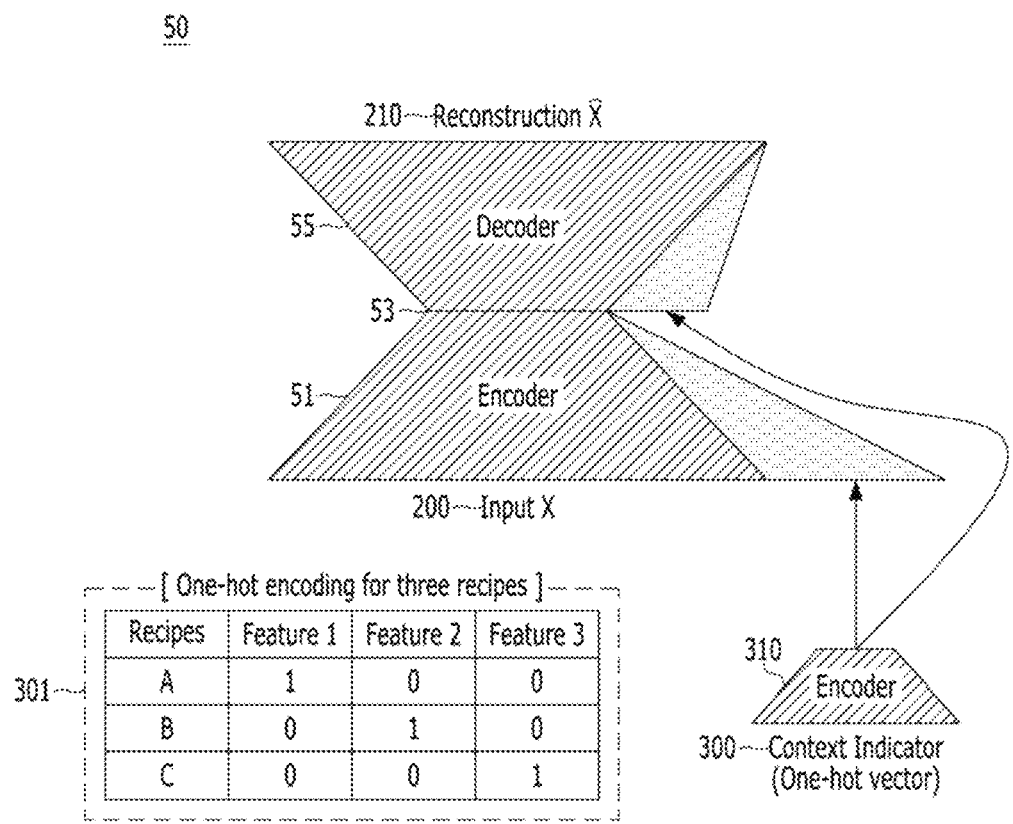
FIG. 9 is a schematic diagram illustrating a neural network model for anomaly detection according to a fourth exemplary embodiment of the present disclosure.

FIG. 9 is a schematic diagram illustrating a neural network model for anomaly detection according to a fourth exemplary embodiment of the present disclosure.

In the fourth exemplary embodiment of the present disclosure, a processor 110 may preprocess a context indicator 300 with a first preprocessing neural network 310 and input the preprocessed context indicator to an intermediate layer 53 of a neural network model 50 or an input layer and the intermediate layer 53. In this case, the neural network model 50 may utilize information associated with input data by the preprocessed context indicator in dimensionality restoration processing (for example, decoding) or dimensionality restoration processing and dimensionality reduction processing for the input data.

In the fourth exemplary embodiment of the present disclosure, the first preprocessing neural network 310 may also be trained at the same time when the neural network model 50 is trained, and may also be first separately trained and then be utilized in the training of the neural network model 50.

FIG. 10 is a schematic diagram illustrating a neural network model for anomaly detection according to a fifth exemplary embodiment of the present disclosure.

In the fifth exemplary embodiment of the present disclosure, a processor 110 may input input data 200 to an input layer, and additionally input a context characteristic indicator 400 to the input layer of a neural network model 50. In this case, the neural network model 50 may utilize information associated with input data by the context characteristic indicator in dimensionality reduction processing (for example, encoding and feature extraction) for the input data.

In the fifth exemplary embodiment of the present disclosure, the neural network model 50 may include an additional node in the input layer in order to receive the context characteristic indicator in addition to the input data. In the neural network model of the fifth exemplary embodiment of the present disclosure, an encoder and a decoder may be asymmetric, and in this case, the neural network of the fifth exemplary embodiment may restore the input data. In this case, output data 210 may be data similar to the input data.

In the neural network model of the fifth exemplary embodiment of the present disclosure, the encoder and the decoder may also be symmetric, and in this case, the neural network of the fifth exemplary embodiment may restore the input data and the context characteristic indicator. In this case, the output data 210 may also be data similar to the input data and the context characteristic indicator.

Figure 11:
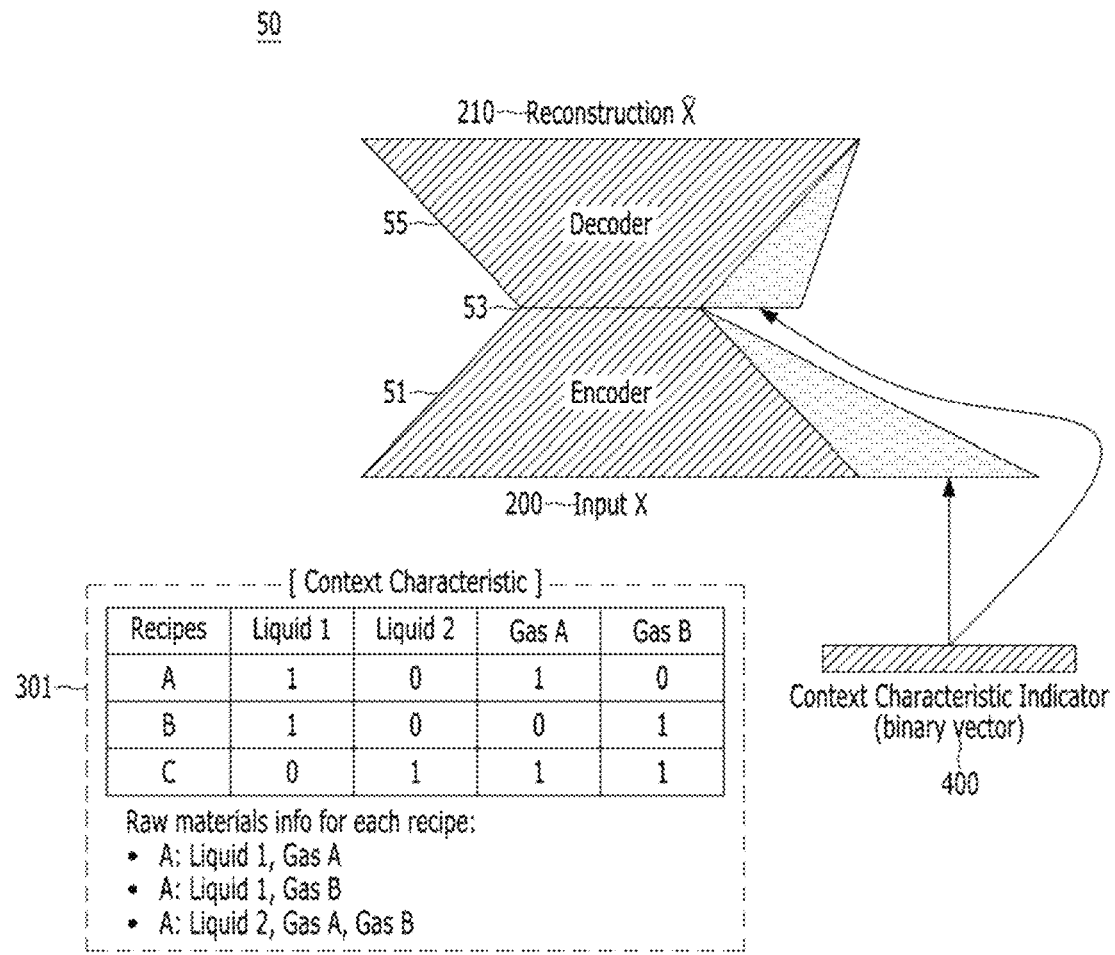
FIG. 11 is a schematic diagram illustrating a neural network model for anomaly detection according to a sixth exemplary embodiment of the present disclosure.

FIG. 11 is a schematic diagram illustrating a neural network model for anomaly detection according to a sixth exemplary embodiment of the present disclosure.

In the sixth exemplary embodiment of the present disclosure, a processor 110 may input input data 200 to an input layer, and additionally input a context characteristic indicator 400 to an intermediate layer 53 of a neural network model 50 or the input layer and the intermediate layer 53. In this case, the neural network model 50 may utilize characteristic information associated with input data by the context characteristic indicator in dimensionality restoration processing (for example, decoding) or dimensionality restoration processing and dimensionality reduction processing for the input data.

In the sixth exemplary embodiment of the present disclosure, the neural network model 50 may include an additional node in the input layer or the intermediate layer (or a partial layer of the decoder) in order to receive the context characteristic indicator in addition to the input data. In the neural network model of the sixth exemplary embodiment of the present disclosure, an encoder and the decoder may be asymmetric, and in this case, the neural network of the sixth exemplary embodiment may restore the input data. In this case, output data 210 may be data similar to the input.

In the neural network model of the sixth exemplary embodiment of the present disclosure, the encoder and the decoder may also be symmetric, and in this case, the neural network of the sixth exemplary embodiment may restore the input data and the context characteristic indicator. In this case, the output data 210 may also be data similar to the input data and the context indicator.

Figure 12:
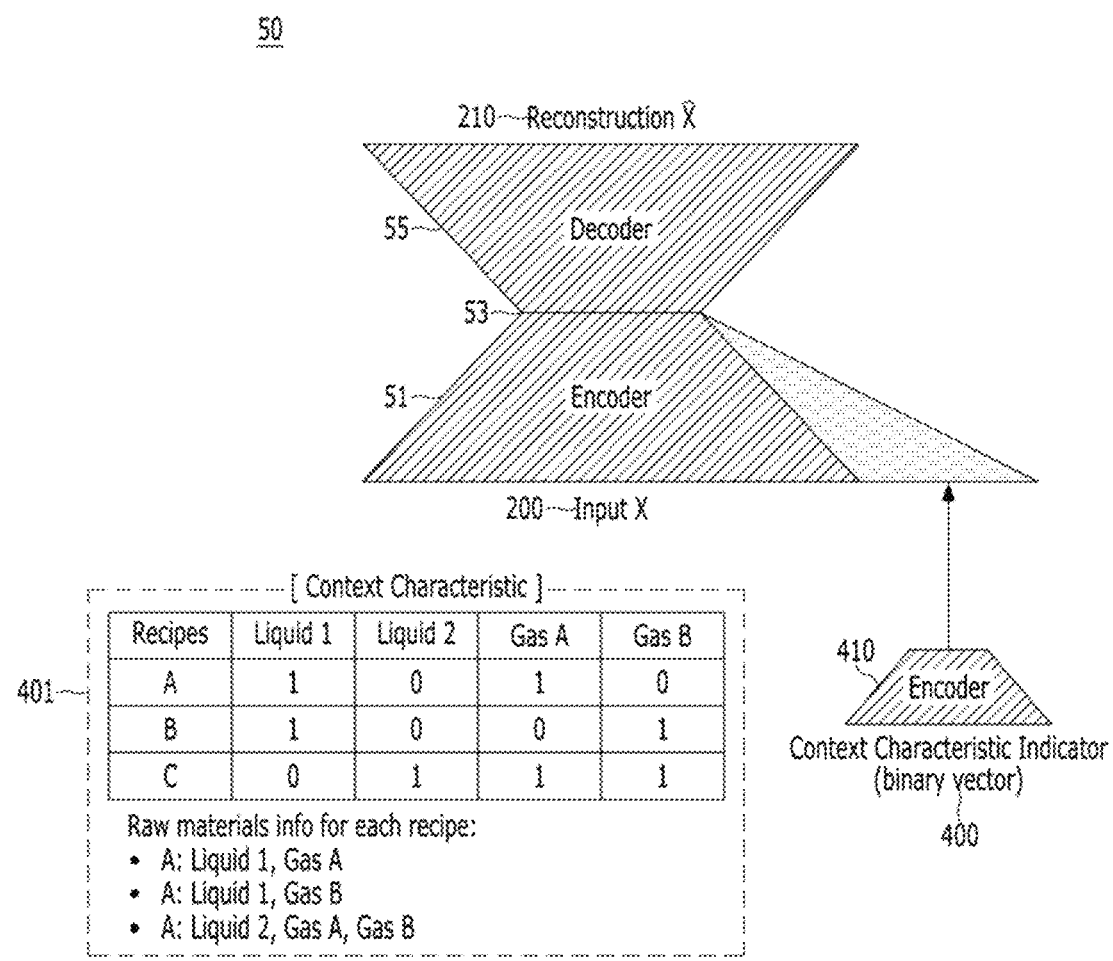
FIG. 12 is a schematic diagram illustrating a neural network model for anomaly detection according to a seventh exemplary embodiment of the present disclosure.

FIG. 12 is a schematic diagram illustrating a neural network model for anomaly detection according to a seventh exemplary embodiment of the present disclosure.

In the seventh exemplary embodiment of the present disclosure, a processor 110 may preprocess a context characteristic indicator 400 with a second preprocessing neural network 410 and input the preprocessed context characteristic indicator to an input layer of a neural network model 50. In this case, the neural network model 50 may utilize information associated with input data by the preprocessed context characteristic indicator in dimensionality reduction processing (for example, encoding and feature extraction) for the input data.

In the seventh exemplary embodiment of the present disclosure, the context characteristic indicator is preprocessed and then is input to the neural network model 50, so that it is possible to lighten the calculation of the neural network model 50. Further, the preprocessed context characteristic indicator is formed of a dense representation of the context indicator, so that the processor 110 may more easily process association with at least one of a manufacturing recipe and manufacturing equipment of the input data when the input data is calculated by using the neural network model 50.

In the seventh exemplary embodiment of the present disclosure, the second preprocessing neural network 310 may also be trained at the same time when the neural network model 50 is trained, and may also be first separately trained and then be utilized in the training of the neural network model 50.

Figure 13:
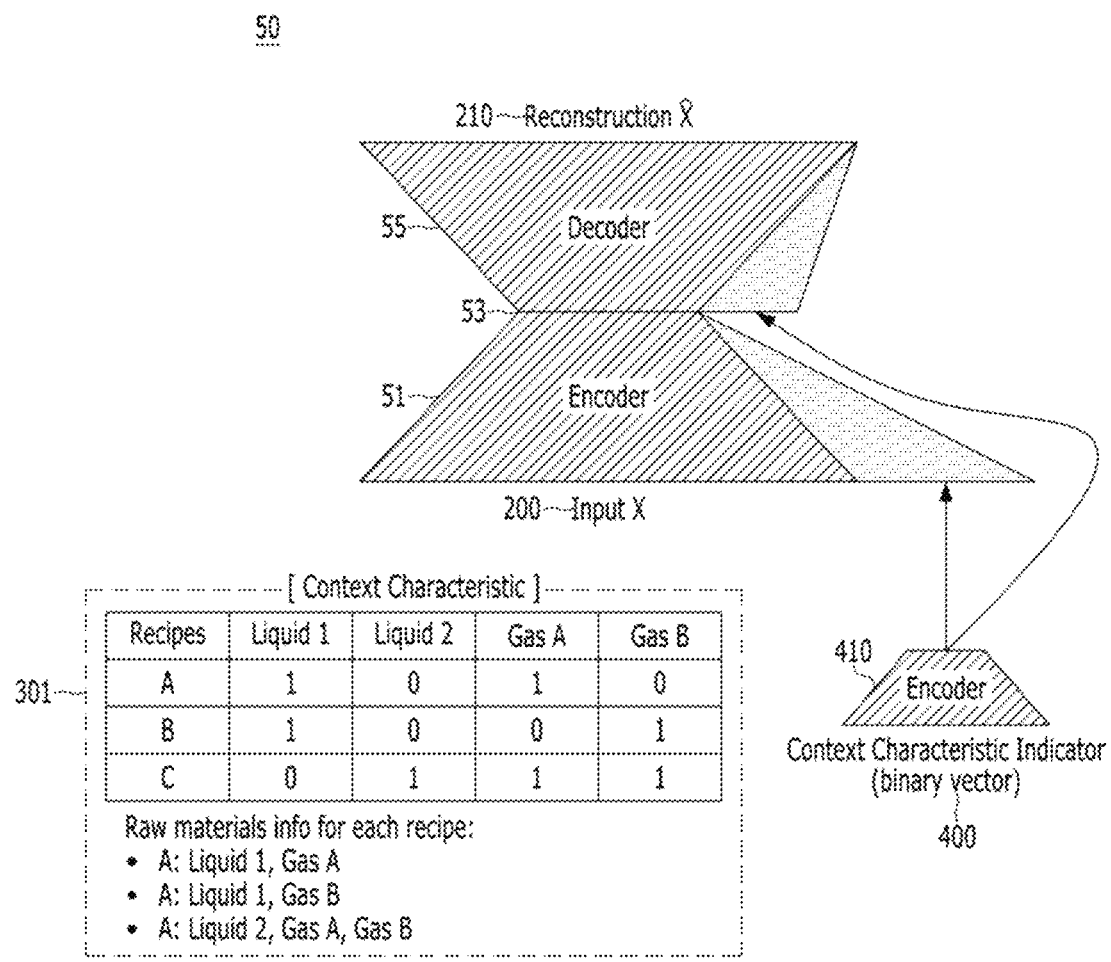
FIG. 13 is a schematic diagram illustrating a neural network model for anomaly detection according to an eighth exemplary embodiment of the present disclosure.

FIG. 13 is a schematic diagram illustrating a neural network model for anomaly detection according to an eighth exemplary embodiment of the present disclosure.

In the eighth exemplary embodiment of the present disclosure, a processor 110 may preprocess a context characteristic indicator 400 with a second preprocessing neural network 410 and input the preprocessed context characteristic indicator to an intermediate layer 53 of a neural network model 50 or an input layer and the intermediate layer 53. In this case, the neural network model 50 may utilize information associated with the input data by the preprocessed context characteristic indicator in dimensionality restoration processing (for example, decoding) or dimensionality restoration processing and dimensionality reduction processing for the input data.

In the eighth exemplary embodiment of the present disclosure, the second preprocessing neural network 410 may also be trained at the same time when the neural network model 50 is trained, and may also be first separately trained and then be utilized in the training of the neural network model 50.

Figure 14:
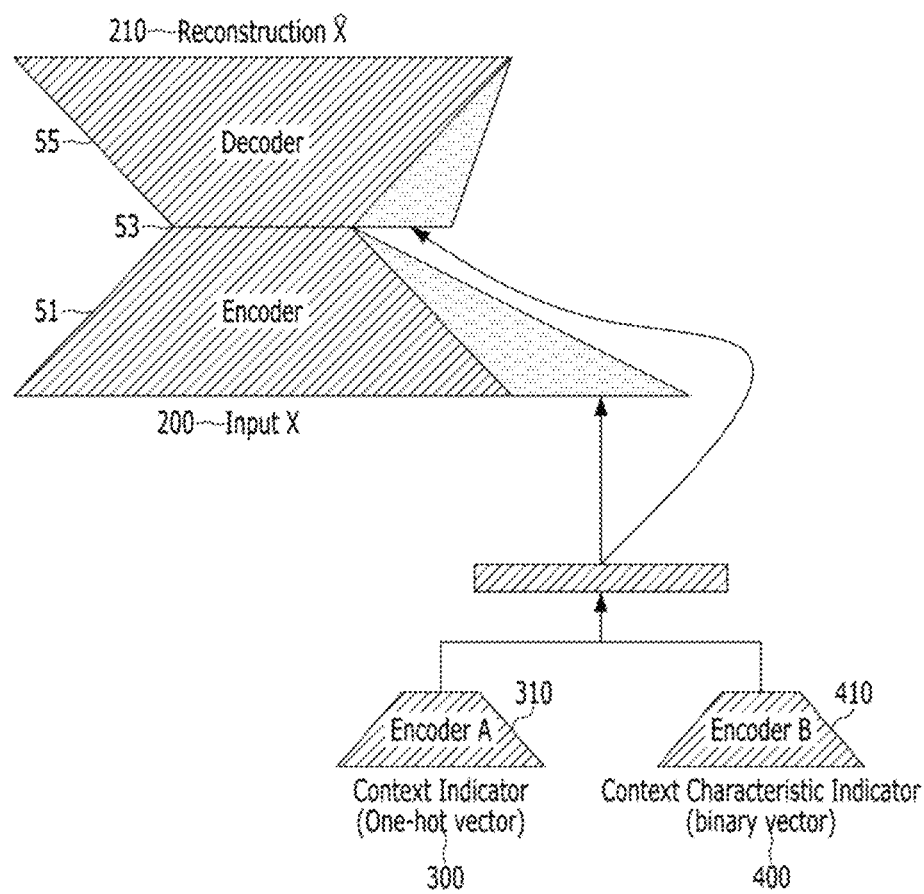
FIG. 14 is a schematic diagram illustrating a neural network model for anomaly detection according to a ninth exemplary embodiment of the present disclosure.

FIG. 14 is a schematic diagram illustrating a neural network model for anomaly detection according to a ninth exemplary embodiment of the present disclosure.

In the ninth exemplary embodiment of the present disclosure, a processor 110 may input input data 200 to an input layer, and additionally input a context indicator 300 and a context characteristic indicator 400 to at least one of the input layer or an intermediate layer 53 of a neural network model 50. In this case, both or one of the context indicator 300 and the context characteristic indicator 400 may be preprocessed. That is, in the ninth exemplary embodiment, the context indicator 300 and the context characteristic indicator 400 may be incorporated to be input to at least one of the input layer and the intermediate layer 53 of the neural network model 50. Further, in the ninth exemplary embodiment, the preprocessed context indicator 300 and the preprocessed context characteristic indicator 400 may be incorporated to be input to at least one of the input layer and the intermediate layer 53 of the neural network model 50.

In this case, the neural network model 50 may utilize information associated with the input data by the context indicator and characteristic information associated with the input data by the context characteristic indicator in dimensionality restoration processing (for example, decoding) or dimensionality restoration processing and dimensionality reduction processing for the input data.

Figure 15:
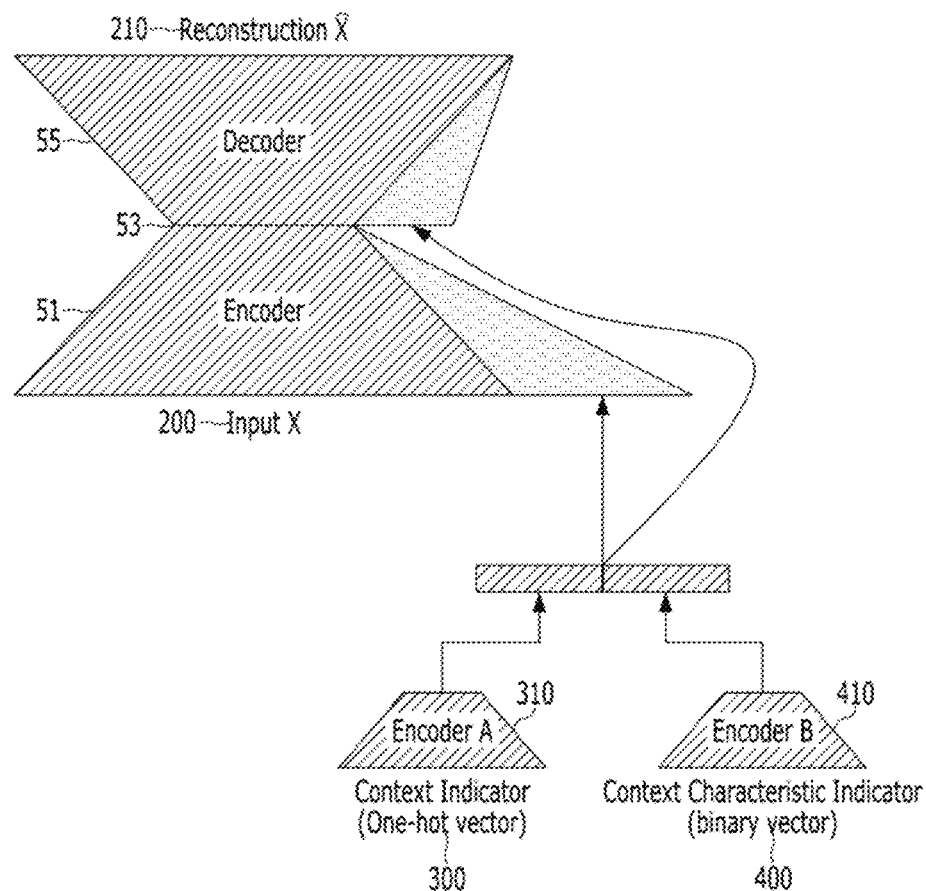
FIG. 15 is a schematic diagram illustrating a neural network model for anomaly detection according to a tenth exemplary embodiment of the present disclosure.

FIG. 15 is a schematic diagram illustrating a neural network model for anomaly detection according to a tenth exemplary embodiment of the present disclosure.

In the tenth exemplary embodiment of the present disclosure, a processor 110 may input input data 200 to an input layer, and additionally input a context indicator 300 and a context characteristic indicator 400 to at least one of the input layer or an intermediate layer 53 of a neural network model 50. In this case, both or one of the context indicator 300 and a context characteristic indicator 400 may be preprocessed. That is, in the tenth exemplary embodiment of the present disclosure, the context indicator 300 (or the preprocessed context indicator) and the context characteristic indicator 400 (or the preprocessed context characteristic indicator) may be input to at least one of the input layer and the intermediate layer 53 of the neural network model 50 without being incorporated with each other unlike the ninth exemplary embodiment. That is, in the tenth exemplary embodiment of the present disclosure, both the context indicator 300 and the context characteristic indicator 400 are additionally input to the neural network, but the input positions thereof may also be different from each other.

In this case, the neural network model 50 may utilize information associated with the input data by the context indicator and characteristic information associated with the input data by the context characteristic indicator in dimensionality restoration processing (for example, decoding) or dimensionality restoration processing and dimensionality reduction processing for the input data.

FIG. 16 is a schematic diagram illustrating a neural network model for anomaly detection according to an eleventh exemplary embodiment of the present disclosure.

In the eleventh exemplary embodiment of the present disclosure, a processor 110 may input a missing characteristic indicator 500 to an input layer of a neural network model 50. In this case, the neural network model 50 may determine whether values of items included in input data are actual data or missing data by the missing characteristic indicator 500 in the processing of the input data.

Figure 17:
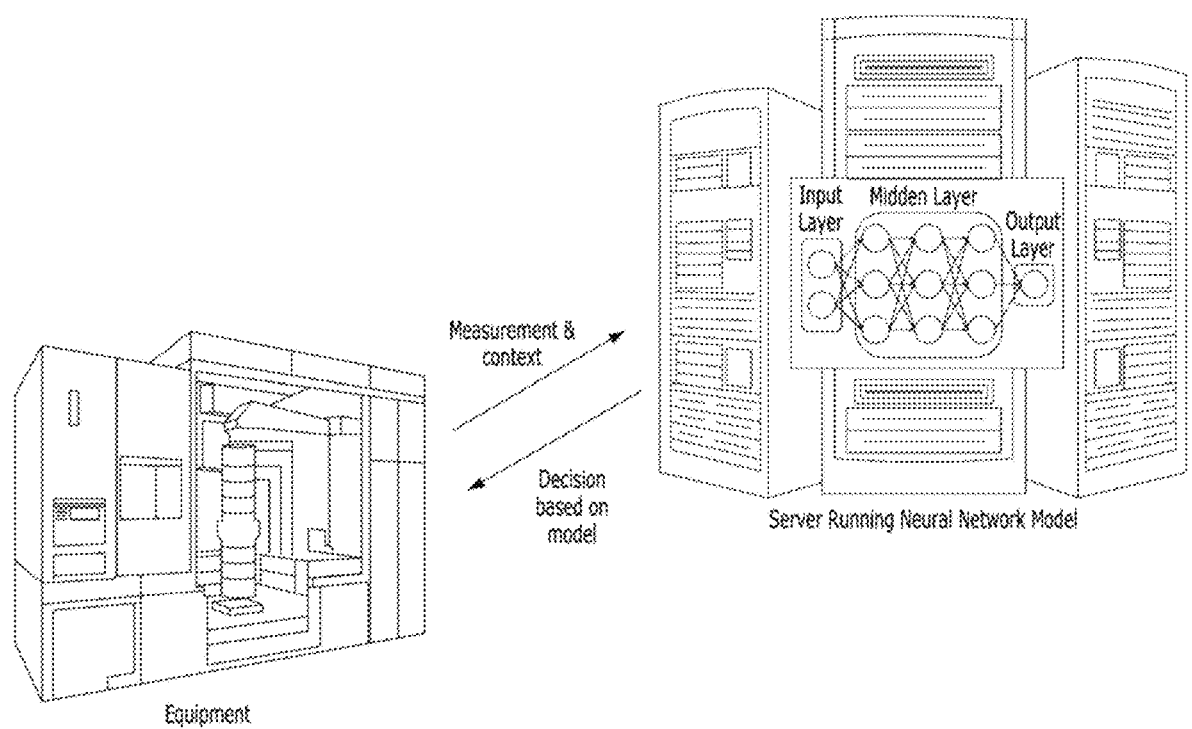
FIG. 17 is a diagram illustrating an example of a configuration of a system for anomaly detection according to an exemplary embodiment of the present disclosure.

FIG. 17 is a diagram illustrating an example of a configuration of a system for anomaly detection according to an exemplary embodiment of the present disclosure.

The system for anomaly detection according to the exemplary embodiment of the present disclosure may include a separate computer device communicable with the manufacturing equipment 20. The neural network model of the exemplary embodiment of the present disclosure may be stored in the separate computer device communicable with the manufacturing equipment 20 and be operated in the computer device. The computer device may communicate with the manufacturing equipment to obtain input data (that is, sensor data), and the obtained input data may be processed in the computer device to perform the anomaly detection.

Figure 18:
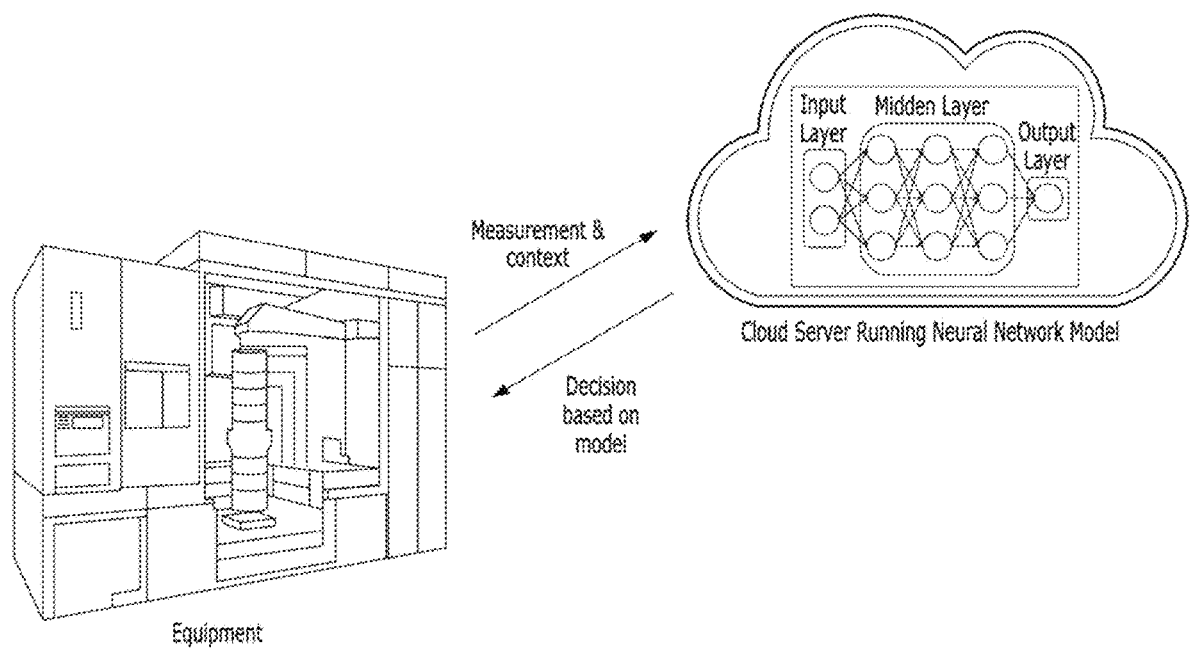
FIG. 18 is a diagram illustrating another example of a configuration of a system for anomaly detection according to an exemplary embodiment of the present disclosure.

FIG. 18 is a diagram illustrating another example of a configuration of a system for anomaly detection according to an exemplary embodiment of the present disclosure.

An anomaly detection method and a computer program according to an exemplary embodiment of the present disclosure may be implemented in a cloud computing environment communicable with the manufacturing equipment 20. The neural network model of the exemplary embodiment of the present disclosure may be stored and operated in the cloud computing environment communicable with the manufacturing equipment 20.

Figure 19:
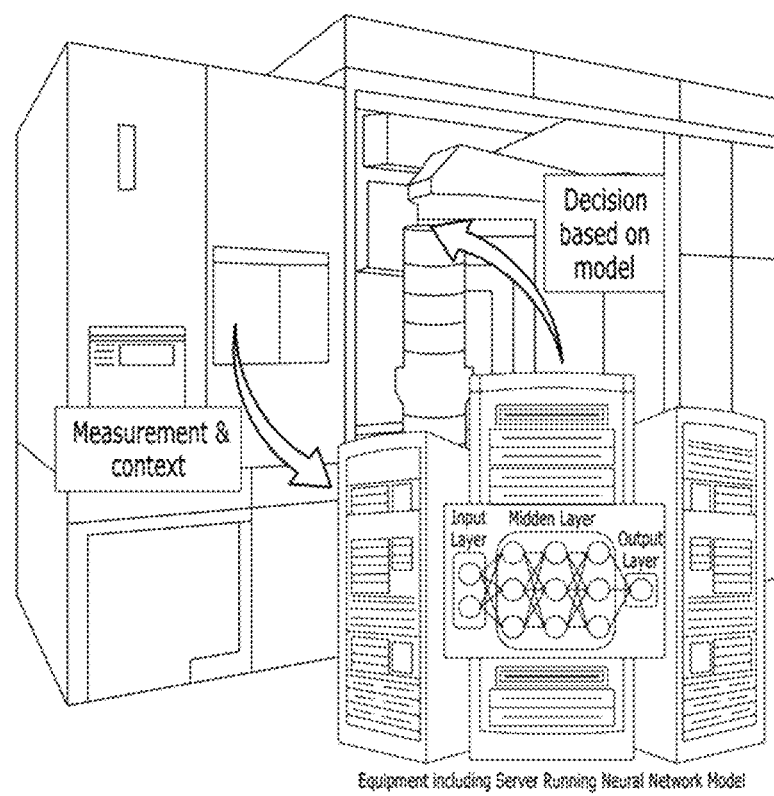
FIG. 19 is a diagram illustrating another example of a configuration of a system for anomaly detection according to an exemplary embodiment of the present disclosure.

FIG. 19 is a diagram illustrating another example of a configuration of a system for anomaly detection according to an exemplary embodiment of the present disclosure.

An anomaly detection method and a computer program according to an exemplary embodiment of the present disclosure may also be implemented in the manufacturing equipment 20.

Figure 20:
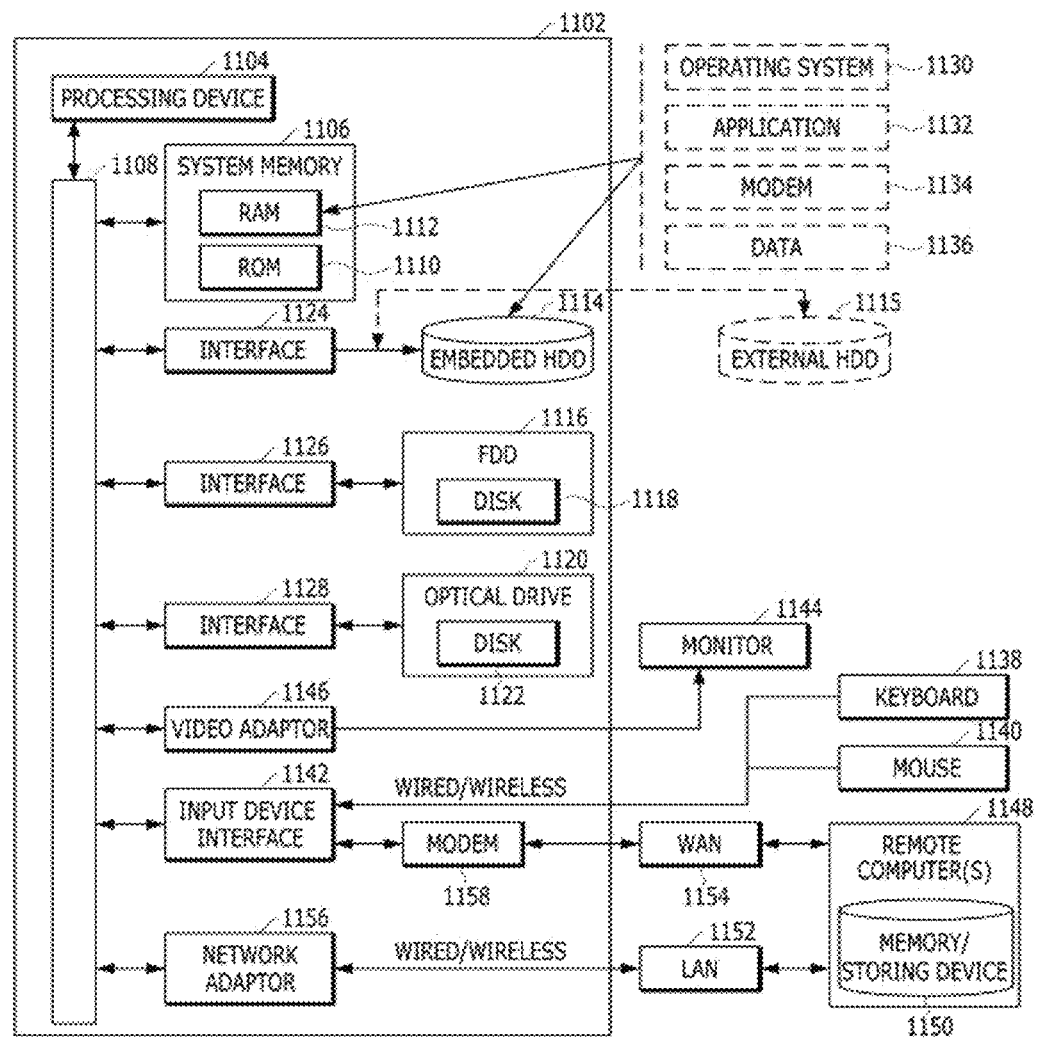
FIG. 20 is a simple and general schematic diagram of an illustrative computing environment, in which the exemplary embodiments of the present disclosure may be implemented.

FIG. 20 is a simple and general schematic diagram of an illustrative computing environment, in which the exemplary embodiments of the present disclosure may be implemented.

The present disclosure has been generally described in relation to a computer executable command executable in one or more computers, but those skilled in the art will appreciate well that the present disclosure is combined with other program modules and/or be implemented by a combination of hardware and software.

In general, a program module includes a routine, a program, a component, a data structure, and the like performing a specific task or implementing a specific abstract data type. Further, those skilled in the art will appreciate well that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be positioned in both a local memory storage device and a remote memory storage device.

The computer generally includes various computer readable media. A computer accessible medium may be a computer readable medium regardless of the kind of medium, and the computer readable medium includes volatile and non-volatile media, transitory and non-non-transitory media, portable and non-portable media. As a non-limited example, the computer readable medium may include a computer readable storage medium and a computer readable transport medium. The computer readable storage medium includes volatile and non-volatile media, transitory and non-non-transitory media, portable and non-portable media constructed by a predetermined method or technology, which stores information, such as a computer readable command, a data structure, a program module, or other data. The computer readable storage medium includes a read only memory (RAM), a read only memory (ROM), electrically erasable and programmable ROM (EEPROM), a flash memory, or other memory technologies, a compact disc (CD)-ROM, a digital video disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally includes all of the information transport media, such as a carrier wave or other transport mechanisms, which implement a computer readable command, a data structure, a program module, or other data in a modulated data signal. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, radio frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various common processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 2110, and a RAM 2112. A basic input/output system (BIOS) is stored in a non-volatile memory 2110, such as a ROM, an erasable and programmable ROM (EPROM), and an EEPROM, and the BIOS includes a basic routine helping a transport of information among the constituent elements within the computer 1102 at a time, such as starting. The RAM 2112 may also include a high-rate RAM, such as a static RAM, for caching data.

The computer 1102 also includes an embedded hard disk drive (HDD) 2114 (for example, enhanced integrated drive electronics (EIDE) and serial advanced technology attachment (SATA))—the embedded HDD 2114 being configured for outer mounted usage within a proper chassis (not illustrated)—a magnetic floppy disk drive (FDD) 2116 (for example, which is for reading data from a portable diskette 2118 or recording data in the portable diskette 2118), and an optical disk drive 1120 (for example, which is for reading a CD-ROM disk 1122, or reading data from other high-capacity optical media, such as a DVD, or recording data in the high-capacity optical media). A hard disk drive 2114, a magnetic disk drive 2116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes at least one of or both a universal serial bus (USB) and the Institute of Electrical and Electronics Engineers (IMANUFACTURING EQUIPMENT) 1394 interface technology.

The drives and the computer readable media associated with the drives provide non-volatile storage of data, data structures, computer executable commands, and the like. In the case of the computer 1102, the drive and the medium correspond to the storage of predetermined data in an appropriate digital form. In the description of the computer readable storage media, the HDD, the portable magnetic disk, and the portable optical media, such as a CD, or a DVD, are mentioned, but those skilled in the art will appreciate well that other types of compute readable storage media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 2130, one or more application programs 2132, other program modules 2134, and program data 2136 may be stored in the drive and the RAM 2112. An entirety or a part of the operation system, the application, the module, and/or data may also be cached in the RAM 2112. Those skilled in the art will appreciate well that the present disclosure may be implemented by several commercially available operating systems or a combination of the operating systems.

A user may input a command and information to the computer 1102 through one or more wired/wireless input devices, for example, a keyboard 1138 and a pointing device, such as a mouse 2138. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IMANUFACTURING EQUIPMENT 1394 serial port, a game port, a USB port, an IR interface, and other interfaces.

A monitor 1144 or other types of display device are also connected to the system bus 1108 through an interface, such as a video adapter 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a workstation, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, Internet.

When the computer 1102 is used in the LAN networking environment, the computer 1102 is connected to the local network 1152 through a wired and/or wireless communication network interface or an adapter 1156. The adapter 1156 may make wired or wireless communication to the LAN 1152 easy, and the LAN 1152 also includes a wireless access point installed therein for the communication with the wireless adapter 1156. When the computer 1102 is used in the WAN networking environment, the computer 1102 may include a modem 1158, is connected to a communication computing device on a WAN 1154, or includes other means setting communication through the WAN 1154 via the Internet and the like. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IMANUFACTURING EQUIPMENT 802.11 (a, b, g, etc.) for providing a safe, reliable, and high-rate wireless connection. The Wi-Fi may be used for connecting to the computer, the Internet, and the wired network (IMANUFACTURING EQUIPMENT 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, electric fields or particles, optical fields or particles, or a predetermined combination thereof.

Those skilled in the art will appreciate that the various illustrative logical blocks, modules, processors, means, circuits, and algorithm operations described herein in relation to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program, a carrier, or a medium accessible from a predetermined computer-readable device. For example, the computer-readable medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be re-arranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics suggested herein.

What is claimed is:

1. A non-transitory computer readable medium storing a computer program, wherein when the computer program is executed by one or more processors of a computing device, the computer program performs methods for processing input data, and the methods include:
    obtaining input data based on sensor data obtained during manufacturing of an article using one or more manufacturing recipes in a plurality of manufacturing equipment or using a plurality of manufacturing recipes in one or more manufacturing equipment;
    feeding the input data and additional information for identifying one or more contexts about the input data into a neural network model loaded on a computer device, wherein the neural network model, including an encoder and a decoder, is trained with the input data and the additional information;
    feeding a context indicator that associates the input data with at least one of a characteristic of one manufacturing recipe of the one or more manufacturing recipes or a characteristic of one manufacturing equipment of the one or more manufacturing equipment, into a first preprocessing neural network model;
    processing the context indicator using the first preprocessing neural network model;
    further feeding a preprocessed context indicator which is an output of the first preprocessing neural network model, into the neural network model,
    wherein the preprocessed context indicator is a dense representation of the context indicator;
    generating an output by processing the input data using the neural network model based on the additional information about the input data, wherein the neural network model processes the input data for different contexts of the input data identified by the additional information; and
    detecting an anomaly for a plurality of normal states corresponding to the input data based on the output of the neural network model.

2. The non-transitory computer readable medium according to claim 1, wherein:
    the context indicator associates the input data with at least one of one manufacturing recipe of the one or more manufacturing recipes or one manufacturing equipment of the one or more manufacturing equipment, and wherein feeding the context indicator comprises feeding into the neural network model by matching with the input data.

3. The non-transitory computer readable medium according to claim 2, wherein the neural network model, implemented by the one or more processors, is configured to process each input data based on the context indicator matched with the each input data.

4. The non-transitory computer readable medium according to claim 3, wherein the neural network model processes the each input data by specifying one or all of one manufacturing equipment of the one or more manufacturing equipment and one manufacturing recipe of the one or more manufacturing recipes, based on the each context indicator matched with the each input data.

5. The non-transitory computer readable medium according to claim 2, wherein the context indicator includes a one hot vector that includes a sparse representation of at least one of one manufacturing recipe of the one or more manufacturing recipes or one manufacturing equipment of the one or more manufacturing equipment.

6. The non-transitory computer readable medium according to claim 2, wherein the further feeding the context indicator into the neural network model by matching with the input data includes:
feeding the context indicator matched with the input data into an input layer or an intermediate layer of the neural network model.

7. The non-transitory computer readable medium according to claim 1, wherein the further feeding a preprocessed context indicator, which is an output of the first preprocessing neural network model, into the neural network model includes:
feeding the preprocessed context indicator into an input layer or an intermediate layer of the neural network model.

8. The non-transitory computer readable medium according to claim 1, wherein the methods further include:
further feeding a context characteristic indicator that associates the input data with at least one of a characteristic of one manufacturing recipe of the one or more manufacturing recipes or a characteristic of one manufacturing equipment of the one or more manufacturing equipment, into the neural network model by matching with the input data.

9. The non-transitory computer readable medium according to claim 8, wherein the neural network model, implemented by the one or more processors, is configured to process each input data based on each context characteristic indicator matched with each input data.

10. The non-transitory computer readable medium according to claim 9, wherein the neural network model processes the each input data based on material characteristic information of the article that is obtained based on the each context characteristic indicator matched with the each input data.

11. The non-transitory computer readable medium according to claim 8, wherein the context characteristic indicator includes a vector representation of at least one of a characteristic of one manufacturing recipe of the one or more manufacturing recipes or a characteristic of one manufacturing equipment of the one or more manufacturing equipment.

12. The non-transitory computer readable medium according to claim 8, wherein the further feeding a context characteristic indicator into the neural network model by matching with the input data, includes:
feeding the context characteristic indicator matched with the input data into an input layer or an intermediate layer of the neural network model.

13. The non-transitory computer readable medium according to claim 1, wherein the methods further include:
feeding a context characteristic indicator that associates the input data with at least one of a characteristic of one manufacturing recipe of the one or more manufacturing recipes or a characteristic of one manufacturing equipment of the one or more manufacturing equipment, into a second preprocessing neural network model;
processing the context characteristic indicator using the second preprocessing neural network model; and
further feeding a preprocessed context characteristic indicator which is an output of the second preprocessing neural network model, into the neural network model, wherein the preprocessed context characteristic indicator is a dense representation of the context characteristic indicator.

14. The non-transitory computer readable medium according to claim 13, wherein the further feeding a preprocessed context characteristic indicator, which is an output of the second preprocessing neural network model, into the neural network model includes:
feeding the preprocessed context characteristic indicator into an input layer or an intermediate layer of the neural network model.

15. The non-transitory computer readable medium according to claim 1, wherein the neural network model is a neural network model capable of processing all or one of encoding and decoding of the input data.

16. The non-transitory computer readable medium according to claim 1, wherein the anomaly includes all or one of an article anomaly of the article and manufacturing equipment anomaly of the one or more manufacturing equipment.

17. The non-transitory computer readable medium according to claim 1, wherein the anomaly includes a manufacturing anomaly detected by a sensor data when the article is produced in the one or more manufacturing equipment.

18. The non-transitory computer readable medium according to claim 1, wherein the neural network model includes a neural network function selected from the group consisting of an AutoEncoder (AE), a Denoising AutoEncoder (DAE), or a Variational AutoEncoder (VAE).

19. The non-transitory computer readable medium according to claim 1, wherein the one or more manufacturing recipes includes an operating parameter of the manufacturing equipment for producing the article that is loaded on the one or more manufacturing equipment.

20. The non-transitory computer readable medium according to claim 1, wherein one input data comprises sensor data obtained during manufacturing of an article by using one manufacturing recipe of the one or more manufacturing recipes in one manufacturing equipment of the one or more manufacturing equipment.

21. A method of processing input data, the method comprising:
obtaining input data based on sensor data obtained during manufacturing of an article using one or more manufacturing recipes in a plurality of manufacturing equipment or using a plurality of manufacturing recipes in one or more manufacturing equipment;
feeding the input data and additional information for identifying one or more contexts about the input data into a neural network model loaded on a computer device, wherein the neural network model, including an encoder and a decoder, is trained with the input data and the additional information;
feeding a context indicator that associates the input data with at least one of a characteristic of one manufacturing recipe of the one or more manufacturing recipes or a characteristic of one manufacturing equipment of the one or more manufacturing equipment, into a first preprocessing neural network model;
processing the context indicator using the first preprocessing neural network model;
further feeding a preprocessed context indicator which is an output of the first preprocessing neural network model, into the neural network model,
wherein the preprocessed context indicator is a dense representation of the context indicator;

generating an output by processing the input data using the neural network model based on the additional information about the input data, wherein the neural network model processes the input data for different contexts of the input data identified by the additional information; and detecting an anomaly for a plurality of normal states corresponding to the input data based on the output of the neural network model.

22. A computing device for processing input data, comprising:

one or more processors; and a memory for storing computer programs executable on the one or more processors;

wherein the one or more processors are configured to:

obtain input data based on sensor data obtained during manufacturing of an article using one or more manufacturing recipes in a plurality of manufacturing equipment or using a plurality of manufacturing recipes in one or more manufacturing equipment;

feed the input data and additional information for identifying one or more contexts about the input data into a neural network model loaded on a computer device, wherein the neural network model, including an encoder and a decoder, is trained with the input data and the additional information;

feed a context indicator that associates the input data with at least one of a characteristic of one manufacturing recipe of the one or more manufacturing recipes or a characteristic of one manufacturing equipment of the one or more manufacturing equipment, into a first preprocessing neural network model;

process the context indicator using the first preprocessing neural network model;

further feed a preprocessed context indicator which is an output of the first preprocessing neural network model, into the neural network model, wherein the preprocessed context indicator is a dense representation of the context indicator;

generate an output by processing the input data using the neural network model based on the additional information about the input data, wherein the neural network model processes the input data for different contexts of the input data identified by the additional information; and detect an anomaly for a plurality of normal states corresponding to the input data based on the output of the neural network model.

* * * * *